(12) United States Patent
Yamasaki et al.

(10) Patent No.: US 7,746,736 B2
(45) Date of Patent: Jun. 29, 2010

(54) OPTICAL HEAD AND OPTICAL DISK DEVICE CAPABLE OF DETECTING SPHERICAL ABERRATION

(75) Inventors: Fumitomo Yamasaki, Nara (JP); Akihiro Arai, Souraku-gun (JP)

(73) Assignee: Panasonic Corporation, Osaka (JP)

( * ) Notice: Subject to any disclaimer, the term of this patent is extended or adjusted under 35 U.S.C. 154(b) by 344 days.

(21) Appl. No.: 11/810,077

(22) Filed: Jun. 4, 2007

(65) Prior Publication Data

US 2007/0237040 A1 Oct. 11, 2007

Related U.S. Application Data

(62) Division of application No. 10/530,424, filed as application No. PCT/JP03/12864 on Oct. 8, 2003, now Pat. No. 7,245,565.

(30) Foreign Application Priority Data

Oct. 10, 2002 (JP) ............................. 2002-297293

(51) Int. Cl.
*G11B 7/00* (2006.01)

(52) U.S. Cl. .............. 369/44.41; 369/44.37; 369/44.32; 369/44.23; 369/112.02

(58) Field of Classification Search ............ 369/112.01, 369/112.03, 112.11, 112.15, 44.32, 44.41, 369/44.37, 53.19, 112.02, 112.05, 44.23
See application file for complete search history.

(56) References Cited

U.S. PATENT DOCUMENTS

| | | | |
|---|---|---|---|
| 5,568,457 A | 10/1996 | Yang et al. | |
| 5,644,563 A | 7/1997 | Yang | |
| 5,754,513 A | 5/1998 | Yagi et al. | |
| 5,790,504 A | 8/1998 | Hayashi et al. | |
| 5,793,735 A | 8/1998 | Oono | |
| 6,185,166 B1 | 2/2001 | Tezuka et al. | |
| 6,185,167 B1 | 2/2001 | Arai et al. | |
| 6,430,137 B1 | 8/2002 | Saimi et al. | |
| 6,498,330 B1 | 12/2002 | Yoshida | |
| 6,567,353 B1 | 5/2003 | Kubo et al. | |

(Continued)

FOREIGN PATENT DOCUMENTS

JP 8-212611 8/1996

(Continued)

*Primary Examiner*—Thang V Tran
*Assistant Examiner*—LaTanya Bibbins
(74) *Attorney, Agent, or Firm*—Hamre, Schumann, Mueller & Larson, P.C.

(57) ABSTRACT

An optical head comprising a light source, objective lens, light splitting means, light receiving element, tracking error signal detection means, and spherical aberration detection means. Light splitting means has six regions divided by a first splitting line parallel to a longitudinal direction of information tracks, and second and third splitting lines perpendicular to the first line. Spherical aberration detection means compares a first focal point shift amount obtained by detecting a light spot size formed by focusing light fluxes, created by laser light passing through two regions between the second and third splitting lines, onto the light receiving element, and a second focal point shift amount obtained by detecting light spot size formed by focusing light fluxes, created by laser light passing through the four regions, on the outer side of second and third splitting lines, generating a spherical aberration error signal for detecting spherical aberration at the objective lens.

9 Claims, 25 Drawing Sheets

U.S. PATENT DOCUMENTS

| | | |
|---|---|---|
| 6,661,415 B1 | 12/2003 | Yasuda et al. |
| 6,909,687 B2 | 6/2005 | Mori et al. |
| 2002/0018406 A1 | 2/2002 | Yamada |
| 2002/0057359 A1 | 5/2002 | Tadano et al. |
| 2002/0060970 A1 | 5/2002 | Ma et al. |
| 2002/0176331 A1 | 11/2002 | Ariyoshi et al. |
| 2004/0082097 A1 | 4/2004 | Lohmeyer et al. |

FOREIGN PATENT DOCUMENTS

| | | |
|---|---|---|
| JP | 11-73658 | 3/1999 |
| JP | 2000-171346 | 6/2000 |
| JP | 2002-157756 | 5/2002 |
| JP | 2002-157764 | 5/2002 |
| JP | 2002-157771 | 5/2002 |
| WO | 02/01554 | 1/2002 |

Information track direction

OPTICAL HEAD AND OPTICAL DISK DEVICE CAPABLE OF DETECTING SPHERICAL ABERRATION

CROSS-REFERENCE TO RELATED APPLICATIONS

This application is a Division of application Ser. No. 10/530,424, filed Apr. 5, 2005, which is a U.S. National Stage of International application no. PCT/JP2003/012864, filed Oct. 8, 2003, which applications are incorporated herein by reference.

TECHNICAL FIELD

The present invention relates to optical heads, which are capable of detecting spherical aberrations, that are used in optical information recording and reproduction apparatuses for recording information onto optical information recording media such as optical disks, or for reproducing information that has been recorded.

BACKGROUND ART

Generally, in order to increase the recording density of optical disk devices, it is necessary either to shorten the wavelength of the light used to record and reproduce optical disks serving as information recording media or to increase the numerical aperture (NA) of the objective lens that focuses the light onto the optical disk.

If the numerical aperture of the objective lens is increased, then a large spherical aberration is generated because of variations in the thickness of the substrate of the optical disk, and in the case of multi-layer structured optical disks, changes in the thickness of the substrate when switching between information recording and reproduction surfaces. If the numerical aperture of the objective lens further is enlarged, then a large coma aberration occurs if a relative inclination (referred to below as "tilt") is generated between the optical axis of the objective lens and the surface of the optical disk.

Due to these spherical and coma aberrations, light spots focused on the optical disk deteriorate, and information recording and reproduction capability is lost. Thus, for optical disk devices in which the recording density is high, there is a need to detect these aberrations and correct them.

For spherical aberration detection means in conventional optical disk devices, the spherical aberration detection means described in JP 2000-171346A is known.

FIG. 20 shows a structural overview of a conventional optical head 90 that is capable of detecting spherical aberration.

In FIG. 20, numeral 101 denotes a semiconductor laser, numeral 104 denotes a collimator lens, numeral 105 denotes an objective lens, numeral 106 denotes an optical disk, numeral 107 denotes a hologram, and numeral 108 denotes a photodetector.

A laser light emitted from the semiconductor laser 101 is converted to substantially parallel light by the collimator lens 104, and is focused by the objective lens 105 through a substrate of the optical disk 106 onto a recording and reproduction information surface. The laser light reflected by the recording and reproduction information surface of the optical disk 106 again passes through the substrate, passes through the objective lens 105 and the collimator lens 104, passes through the hologram 107 and is diffracted to be incident on the signal detecting photodetector 108.

The hologram 107 has a pattern as shown in FIG. 21.

The hologram 107 contains three regions: a first region "a" that is bounded by a straight line L that is perpendicular to the optical axis, and a first semicircle E1 that is centered on the optical axis; a second region "b" that is bounded by the first semicircle E1, a second semicircle E2 that has a radius larger than the semicircle E1 and is positioned on the same side of the straight line L as the semicircle E1, and the straight line L; and a third region "c" that is bounded by a third semicircle E3 that is on the opposite side of the straight line L from the first semicircle E1 and the second semicircle E2, and the straight line L.

The regions "a", "b" and "c" of the hologram 107 are configured such that the focal spots of the light passing through the regions "a", "b" and "c" from the optical disk 106 side, corresponding to the regions "a", "b" and "c" are focused separately on the photodetector 108. That is to say, the light passing through the three regions "a", "b" and "c" of the hologram 107 from the optical disk 106 side is formed as focal spots in three locations on the photodetector 108.

As shown in FIG. 22A to FIG. 22C, the photodetector 108 is configured by five light receiving regions 108a to 108e. The light flux from the first region "a" of the hologram 107, of the light fluxes of the laser light reflected by the optical disk 106, is formed as a focal spot P1 on the borderline of the light receiving regions 108a and 108b, the light flux from the second region "b" of the hologram 107 is formed as a focal spot P2 on the borderline of the light receiving regions 108c and 108d, and the light flux from the third region "c" is formed as a focal spot P3 in the light receiving region 108e.

Thus, when an information signal (reproduction signal) RF recorded on the optical disk 106 is expressed using output electric signals from the light receiving regions 108a to 108e, it is given by:

Reproduction signal RF=signal obtained by the light receiving region 108a+signal obtained by the light receiving region 108b+signal obtained by the light receiving region 108c+signal obtained by the light receiving region 108d+signal obtained by the light receiving region 108e.

When the substrate of the optical disk 106 is suitable and there is no generation of spherical aberration and when the focal point is correctly formed on the optical disk 106, that is to say, when it is focused, the shape of the focal spots P1 to P3 formed on the light receiving regions 108a to 108e are spots of substantially the same size, as shown in FIG. 22B.

Thus, the focal spot P1 of the light flux diffracted at the hologram 107 is formed such that the irradiated areas of the light receiving regions 108a and 108b are equal. That is to say, this indicates that the values of the electric signal obtained from the light receiving region 108a and the electric signal obtained from the light receiving region 108b are equal. In a similar manner, the focal spot P2 is formed such that the irradiated areas of the light receiving regions 108c and 108d are equal.

Generally, if the thickness of the substrate of the optical disk 106 is not suitable, then spherical aberration occurs in focusing optical systems having the above-noted configuration.

FIG. 23 shows the state of the light rays when spherical aberration occurs. When spherical aberration occurs, there is generation of a shift in the focal position that depends on the distance of the light ray from an optical axis "o". That is to say, when the light ray "b" is focused on a surface "F", the light ray "a", which is further from the optical axis "o" than the light ray "b", is focused in front of the surface "F", and the light ray "c", which is further closer to the optical axis "o" than the light ray "b", is focused behind the surface "F".

That is to say, by detecting the state of the focus in two regions whose distance from the optical axis "o" is different from each other, it is possible to know the spherical aberration situation.

If spherical aberration has occurred in the focusing optical system, then even if the system is focused, that is to say, even if the difference in the electric signal between the light receiving region 108a and the light receiving region 108b is 0, then the difference in the electric signal between the light receiving region 108c and the light receiving region 108d is not 0, but takes on a positive or negative value. Thus, this indicates that a positive or negative spherical aberration has occurred.

If a positive or negative spherical aberration occurs in the above-noted focusing optical system, then assuming, for example, that a positive spherical aberration occurs, since the focal position of the focal spot P2 of the light receiving regions 108c and 108d, which is a light flux of the second light ray "b", which is a further distance from the optical axis, is in front of the light receiving surface of the photodetector 108, the focal spot P2 is enlarged in a half donut-shape over the light receiving region 108d as shown in FIG. 21A. Conversely, when a negative spherical aberration occurs, since the focal position of the focal spot P2 of the light receiving region 108c and the light receiving region 108d is behind the light receiving surface of the photodetector 108, the focal spot P2 is enlarged in a half donut-shape over the light receiving region 108c as shown in FIG. 22C.

Consequently, a spherical aberration signal SAE, which is a signal indicating that spherical aberration has occurred in the focusing optical system, is as given below.

Spherical aberration signal SAE=signal obtained by the light receiving region 108c−signal obtained by the light receiving region 108d−K×(signal obtained by the light receiving region 108a−signal obtained by the light receiving region 108b), where K is a constant.

It should be noted that the means described in JP H8-212611A is known as aberration correction means for correcting spherical aberration. If there is a change in the substrate thickness of optical disks, then liquid crystal elements are controlled to correct the aberration in accordance with a spherical aberration detection signal.

Liquid crystal elements are elements in which a liquid crystal is sealed in a section that is sandwiched between two glass substrates. When the part through which laser light passes is divided into a plurality of regions and an independent voltage is applied to each region, it is possible to change the refractive index of the corresponding parts. It is possible to alter the phase of the wavefronts by utilizing these changes in the refractive index. Since the phase of the laser light changes sectionally when the laser light contains aberrations, the aberrations can be corrected by activating the liquid crystal elements so as to complement the altered phases. When a voltage is applied in accordance with the degree of aberration, it is possible to correct the aberrations with greater accuracy. If spherical aberration has occurred, then the phase of the liquid crystal elements is controlled so as to minimize wavefront aberration.

The means described in International Application PCT/JP01/05366 is known as conventional tilt detecting means for optical disk devices.

FIG. 24 shows a structural overview of a conventional optical head 80 which is capable of tilt detection.

In FIG. 24, numeral 201 denotes a semiconductor laser, numeral 202 denotes a beam splitter, numeral 204 denotes a collimator lens, numeral 205 denotes an objective lens, numeral 206 denotes an optical disk, numeral 207 denotes a relay lens and numeral 208 denotes a photodetector.

The laser light emitted from the semiconductor laser 201 passes through the beam splitter 202, is converted to substantially parallel light by the collimator lens 204, and passes through the substrate to be focused on the recording and reproduction information surface of the optical disk 206 by the objective lens 205.

The laser light reflected by the recording and reproduction information surface of the optical disk 206 again passes through the substrate, passes through the objective lens 205 and the collimator lens 204, is reflected by the beam splitter 202 and is guided to the signal detecting photodetector 208 by the relay lens 207.

The light fluxes incident on the photodetector 208 as shown in FIG. 25A are divided into six parts and are received by the light receiving regions 208a to 208f. A first tracking error signal TE1 is detected using the signals received by the light receiving regions 208e and 208f, and a second tracking error signal TE2 is detected using the signals received by the light receiving region 208a to the light receiving region 208d.

Since the tracking error signals are push pull signals, the tracking error signals TE1 and TE2 are expressed by the following formula.

Tracking error signal TE1=signal received by the light receiving region 208e−signal received by the light receiving region 208f.

Tracking error signal TE2=(signal received by the light receiving region 208a+signal received by the light receiving region 208b)−(signal received by the light receiving region 208c+signal received by the light receiving region 208d).

The inclination (tilt) of the optical disk can be detected by comparing the phases of the first tracking error signal TE1 and the second tracking error signal TE2.

FIG. 25B is a diagram in which the scope of the light receiving regions is superimposed on a distribution of the light intensity of the detected light fluxes when the optical disk is tilted in the radial direction. Although there is an asymmetry in the intensity distribution of the light fluxes, in accordance with the tilt of the optical disk, a large portion of that asymmetry occurs on the light receiving regions 208e and 208f, as shown in FIG. 25B. Thus, the degree of influence of the tilt of the optical disk differs between the first tracking error signal TE1 and the second tracking error signal TE2.

When the optical disk is not tilted, the phase of the two tracking error signals TE1 and TE2 coincide, but when the optical disk tilts, a phase shift is created between the two tracking error signals TE1 and TE2. Since the degree of influence of the tilt of the optical disk differs for each signal, it is possible to detect the tilt of the optical disk by comparing the phases of the first tracking error signal TE1 and the second tracking error signal TE2.

It should be noted that even when a conventional push pull signal, that is to say, a push pull signal TE3 obtained by the calculation, > push pull signal TE3=(signal received by the light receiving region 208a+signal received by the light receiving region 208b+signal received by the light receiving region 208e)−(signal received by the light receiving region 208c+signal received by the light receiving region 208d+signal received by the light receiving region 208f), is used as the first tracking error signal TE1, it is possible to detect the tilt of the optical disk. This is because, since the push pull signal TE3 corresponds to a signal that is the sum of the tracking error signals TE1 and TE2, a sufficiently detectable phase difference is generated between the first and second tracking error signals TE1 and TE2.

However, in a conventional configuration, because the spherical aberration detection means and the tilt detecting means are configured independently for detecting both aberrations, there is the problem of mutual interference between the pattern of the hologram and the pattern of the photodetector. Alternatively, because the number of divisions of the light fluxes increases, the electric signal detected by the light receiving regions decreases, there is the problem that the S/N ratio necessary for detecting aberration cannot be obtained.

It is an object of the present invention to realize simultaneously spherical aberration detection and tilt detection using the configuration of a simple hologram and photodetector, and also to provide an optical head of a simple configuration that includes a tracking error signal detection and focus error signal detection capable of correcting offset when the objective lens is moved.

DISCLOSURE OF INVENTION

The optical head according to the present invention includes: a light source for radiating laser light, an objective lens for focusing the laser light that is radiated from the light source onto an information recording medium, light splitting means for spatially dividing the laser light that is reflected by the information recording medium and that passes through the objective lens into a plurality of light fluxes, a light receiving element for receiving the plurality of light fluxes divided by the light splitting means, tracking error signal detection means for detecting a tracking error signal based on the plurality of light fluxes received by the photodetector, and spherical aberration detection means for detecting spherical aberration that occurs at the objective lens, based on the plurality of light fluxes received by the light receiving element. The light splitting means has six regions that are divided by a first splitting line that is substantially parallel to a longitudinal direction of an information track formed on the information recording medium, and second and third splitting lines arranged in parallel that are substantially perpendicular to the first splitting line, and that are substantially symmetrical about the optical axis of the focusing optical system. The tracking error signal detection means generates the tracking error signal by calculating signals detected by receiving light fluxes created by laser light passing through those two of the six regions that are disposed between the second and third splitting lines, and generates a signal for correcting the offset of the tracking error signal caused by movement of the objective lens by calculating signals detected by receiving light fluxes created by laser light passing through those four of the six regions that are disposed on the outer side of the second and third splitting lines. The spherical aberration detection means compares a first focal point shift amount obtained by detecting the size of a light spot formed by focusing the light fluxes created by laser light passing through two regions that are disposed between the second and third splitting lines onto the light receiving element, and a second focal point shift amount obtained by detecting the size of a light spot formed by focusing the light fluxes created by laser light passing through the four regions that are disposed on the outer side of the second and third splitting lines onto the light receiving element, to generate a spherical aberration error signal for detecting the spherical aberration generated at the objective lens.

Another optical head according to the present invention includes: a light source for radiating laser light, an objective lens for focusing the laser light that is radiated from the light source onto an information recording medium, light splitting means for spatially dividing the laser light that is reflected by the information recording medium and that passes through the objective lens into a plurality of light fluxes, a light receiving element for receiving the plurality of light fluxes divided by the light splitting means, tracking error signal detection means for detecting a tracking error signal, based on the plurality of light fluxes received by the light receiving element, and spherical aberration detection means for detecting spherical aberration that occurs at the objective lens, based on the plurality of light fluxes received by the light receiving element. The light splitting means has eight regions that are divided by a first splitting line that is substantially parallel to the longitudinal direction of the information track formed on the information recording medium, a second splitting line that is substantially perpendicular to the first splitting line and that passes through the optical axis of the objective lens, a third splitting line that is substantially parallel to the second splitting line and a semicircle-shaped fourth splitting line that is on the other side of the third splitting line to the second splitting line, and that is centered on the optical axis of the focusing optical system. The tracking error signal detection means generates the tracking error signal by calculating signals detected by receiving light fluxes created by laser light passing through those two of the eight regions that are disposed between the second and third splitting lines, and generates a signal for correcting the offset of the tracking error signal caused by movement of the objective lens, by calculating signals detected by receiving light fluxes created by laser light passing through those two of the eight regions that are disposed on the outer side of the third splitting lines. The spherical aberration detection means compares a first focal point shift amount obtained by comparing the quantity of light detected on a first light receiving region and a second light receiving region by focusing the light fluxes created by laser light passing through the two regions enclosed by the second splitting line and the fourth splitting line, onto the splitting line of the first light receiving region and the second light receiving region formed on the light receiving element, and a second focal point shift amount obtained by comparing the quantity of light detected on a third light receiving region and a fourth light receiving region by focusing the light fluxes created by laser light passing through the two regions on the outer side of the fourth splitting line, onto the splitting line of the third light receiving region and the fourth light receiving region formed on the light receiving element, to generate a spherical aberration error signal for detecting the spherical aberration generated at the objective lens.

Yet another optical head according to the present invention includes: a light source for radiating laser light, an objective lens for focusing the laser light that is radiated from the light source onto an information recording medium, light splitting means for spatially dividing the laser light that is reflected by the information recording medium and that passes through the objective lens into a plurality of light fluxes, a light receiving element for receiving the plurality of light fluxes divided by the light splitting means, tracking error signal detection means for detecting a tracking error signal based on the plurality of light fluxes received by the light receiving element, and spherical aberration detection means for detecting spherical aberration that occurs at the objective lens, based on the plurality of light fluxes received by the light receiving element. The light splitting means has eight regions that are divided by a first splitting line that is substantially parallel to the longitudinal direction of the information track formed on the information recording medium, second and third splitting lines arranged in parallel that are substantially perpendicular to the first splitting line and are substantially symmetrical about the optical axis of the objective lens, and a fourth splitting line that is circular, positioned between the second and third splitting lines and centered on the optical axis of the focusing optical system. The tracking error signal detection means generates the tracking error signal by calculating signals detected by receiving light fluxes created by laser light passing through those two of the eight regions that are disposed on the outer side of the fourth splitting line and between the second and third splitting lines, and generates a signal for correcting the offset of the tracking error signal caused by movement of the objective lens, by calculating signals detected by receiving light fluxes created by laser light passing through four regions, of the eight regions, that are disposed on the outer side of the second and third splitting lines. The spherical aberration detection means compares a first focal point shift amount obtained by detecting changes in the shape of a light spot that is focused on the light receiving element by applying an astigmatism to light fluxes created by laser light passing through a region on the inner side of the fourth splitting line, and a second focal point shift amount obtained by detecting changes in the shape of a light spot that is focused on the light receiving element by applying an astigmatism to light fluxes created by laser light passing through the entire region of the light splitting means, to generate a spherical aberration error signal for detecting the spherical aberration generated at the objective lens.

An optical disk device according to the present invention includes: an optical head according to the present invention; and a control circuit for attaching an electrical offset to a focus error signal to create a predetermined focal point shift, and determining the constant "k" such that the fluctuations of the spherical aberration error signal SAE=SAE2−k×SAE1 in the range of the predetermined focal point shift are within a predetermined range.

BEST MODE FOR CARRYING OUT THE INVENTION

Figure 1:
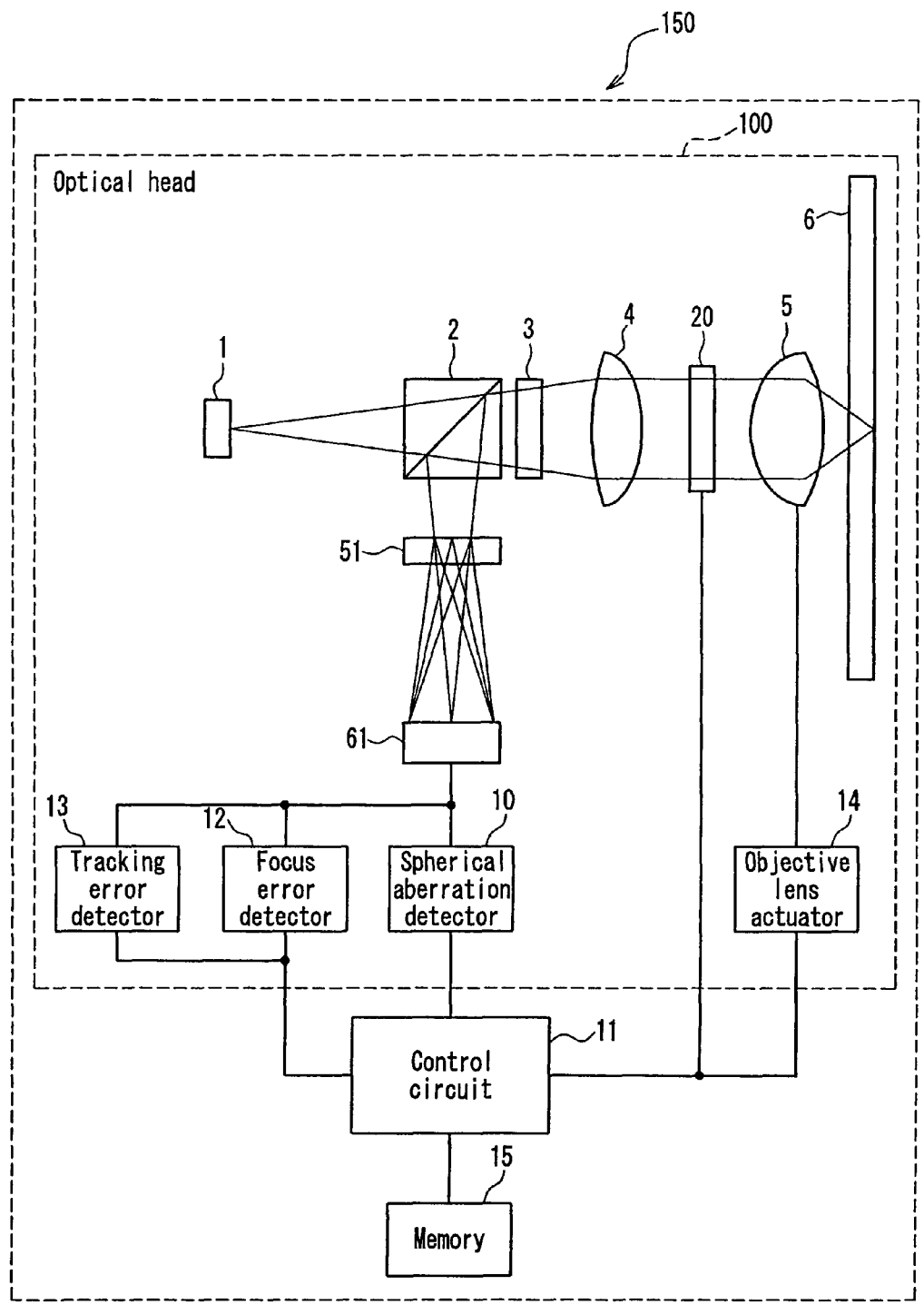
FIG. 1 is a structural overview of an optical head according to Embodiment 1.

In an optical head according to the present embodiment, spherical aberration detection means compares a first focal point shift amount obtained by detecting the size of a light spot formed by focusing light fluxes created by laser light passing through two regions that are disposed between second and third splitting lines onto a photodetector, and a second focal point shift amount obtained by detecting the size of a light spot formed by focusing light fluxes created by laser light passing through four regions that are disposed on the outer side of the second and third splitting lines onto the photodetector, to generate a spherical aberration error signal for detecting the spherical aberration generated at an objective lens. Thus, spherical aberration can be detected with a simple configuration of a hologram and the photodetector.

It is preferable that the optical head according to the present invention further includes tilt detection means for detecting the relative inclination between the objective lens and the information recording medium, wherein the interval between the second and third splitting line is narrower than the width, in the longitudinal direction of the information track of the information recording medium, of the region in which 0-order light and ±1-order light that are diffracted at the information track of the information recording medium are superimposed; and wherein the tilt detection means compares the phase of a first tracking error signal obtained by calculating signals detected by receiving light fluxes created by laser light passing through two regions that are disposed between the second and third splitting lines, and of a second tracking error signal obtained by calculating signals detected by receiving light fluxes created by laser light passing through the entire region of the light splitting means, to generate a tilt error signal for detecting the relative inclination between the objective lens and the information recording medium.

In another optical head according to the present embodiment, spherical aberration detection means compares a first focal point shift amount obtained by comparing quantity of light detected on a first light receiving region and a second light receiving region by focusing light fluxes created by laser light passing through the two regions enclosed by a second splitting line and a fourth splitting line onto the splitting line of the first light receiving region and the second light receiving region formed on a photodetector, and a second focal point shift amount obtained by comparing quantity of light detected on a third light receiving region and a fourth light receiving region by focusing the light fluxes created by laser light passing through the two regions on the outer side of the fourth splitting line onto the splitting line of the third light receiving region and the fourth light receiving region formed on the photodetector, to generate a spherical aberration error signal for detecting the spherical aberration generated at an objective lens. Thus, spherical aberration can be detected with a simple configuration of a hologram and a photodetector.

It is preferable that an optical head according to the present embodiment further includes tilt detection means for detecting the relative inclination between the objective lens and the information recording medium, wherein the interval between second and third splitting lines is narrower than half the width, in the longitudinal direction of the information track of the information recording medium, of the region in which 0-order light and ±1-order light that are diffracted at the information track of the information recording medium are superimposed, and wherein the tilt detection means compares the phase of a first tracking error signal obtained by calculating signals detected by receiving light fluxes created by laser light passing through two regions that are disposed between the second and the third splitting lines, and of a second tracking error signal obtained by calculating signals detected by receiving light fluxes created by laser light passing through the entire region of the light splitting means, to generate a tilt error signal for detecting the relative inclination between the objective lens and the information recording medium.

In yet another optical head according to the present embodiment, spherical aberration detection means compares a first focal point shift amount obtained by detecting changes in the shape of a light spot that is focused on the photodetector by applying an astigmatism to light fluxes created by laser light passing through a region on the inner side of the fourth splitting line, and a second focal point shift amount obtained by detecting changes in the shape of a light spot that is focused on the photodetector by applying an astigmatism to light fluxes created by laser light passing through the entire region of the light splitting means, to generate a spherical aberration error signal for detecting the spherical aberration generated at the objective lens. Thus, spherical aberration can be detected with a simple configuration of a hologram and a photodetector.

It is preferable that an optical head according to the present embodiment further includes tilt detection means for detecting the relative inclination between the objective lens and the information recording medium, wherein the interval between the second and third splitting line is narrower than the width, in the longitudinal direction of the information track of the information recording medium, of the region in which 0-order light and ±1-order light that are diffracted at the information track of the information recording medium are superimposed; and wherein the tilt detection means compares the phase of a first tracking error signal obtained by calculating signals detected by receiving light fluxes created by laser light passing through two regions that are disposed on the outer side of the fourth splitting line and between the second and the third splitting lines, and of a second tracking error signal obtained by calculating signals detected by receiving light fluxes created by laser light passing through the entire region of the light splitting means, to generate a tilt error signal for detecting the relative inclination between the objective lens and the information recording medium.

It is preferable that the signal indicating the first focal point shift amount is SAE1 and the signal indicating the second focal point shift amount is SAE2, and the spherical aberration error signal SAE is expressed by: SAE=SAE2−k×SAE1, (where "k" is a constant that substantially satisfies k=SAE2/SAE1 when there is no spherical aberration and when the focal point shift amount is within a predetermined range).

It is preferable that the light splitting means includes a polarizing hologram.

It is preferable that the photodetector is an integrated light receiving/emitting element that is configured as a single unit with the light source.

It is preferable that the photodetector is integrated with the light source and the light splitting means to form an integrated optical element.

It is preferable that an optical head according to the present embodiment further includes a liquid crystal element provided between the objective lens and the light splitting means, and spherical aberration correction means for correcting the spherical aberration by changing the phase of wavefronts that pass through a liquid crystal element due to the application of a voltage in accordance with the spherical aberration error signal created by the spherical aberration detection means.

Embodiments of the present invention are described below with reference to the drawings.

Embodiment 1

FIG. 1 shows a structural overview of an optical disk device 150 according to Embodiment 1 of the present invention. The optical disk 150 includes an optical head 100, a control circuit 11 and a memory 15.

In the optical head 100 shown in FIG. 1, numeral 1 denotes a semiconductor laser that corresponds to a light source, numeral 2 denotes a polarizing beam splitter, numeral 3 denotes a ¼ wavelength plate, numeral 4 denotes a collimator lens, numeral 5 denotes an objective lens that corresponds to a focusing optical system, numeral 6 denotes an optical disk, numeral 51 denotes a hologram that corresponds to light splitting means, numeral 61 denotes a photodetector that corresponds to a light receiving element, numeral 10 denotes a spherical aberration detector, numeral 12 denotes a focus error detector, numeral 13 denotes a tracking error detector and numeral 14 denotes an objective lens actuator. Numeral 20 denotes a liquid crystal element that corresponds to spherical aberration correction means.

Linearly polarized laser light that is emitted from the semiconductor laser 1 passes through the polarizing beam splitter 2, is converted to circularly polarized light by the ¼ wavelength plate 3, is converted to substantially parallel light by the collimator lens 4, passes through the liquid crystal element 20 and passes through the substrate to be focused on the recording and reproduction information surface of the optical disk 6 by the objective lens 5.

The laser light reflected by the recording and reproduction information surface of the optical disk 6 passes again through the substrate, passes through the objective lens 5, the liquid crystal element 20 and the collimator lens 4, and is converted to linearly polarized light that is different from that of the forward light path by the ¼ wavelength plate, after which it is reflected by the polarizing beam splitter 2. The polarizing beam splitter 2 has been designed such that it allows the polarized component of the laser light on the forward light path substantially to pass, and substantially to reflect the polarized component of the laser light on the return light path.

The laser light on the return light path that is reflected by the polarizing beam splitter 2 is spatially divided into a plurality of light fluxes and guided to the photodetector 61 by passing through and being diffracted by the hologram 51. The photodetector 61 is divided into a plurality of light receiving regions, and light that is incident on the light receiving regions is converted to signals depending on the quantity of light, which are transmitted to the spherical aberration detector 10, the focus error detector 12 and the tracking error detector 13.

The signals detected by the photodetector 61 is processed by the focus error detector 12 and the tracking error detector 13, and in accordance with a signal that has been calculated by the focus error detector 12 and the tracking error detector 13 and undergone a predetermined process in the control circuit 11, the objective lens actuator 14 drives the objective lens 5 such that the focal spot formed on the recording and reproduction information surface of the optical disk 6 by the objective lens 5 follows the information track formed on the recording and reproduction surface of the optical disk 6.

Figure 2:
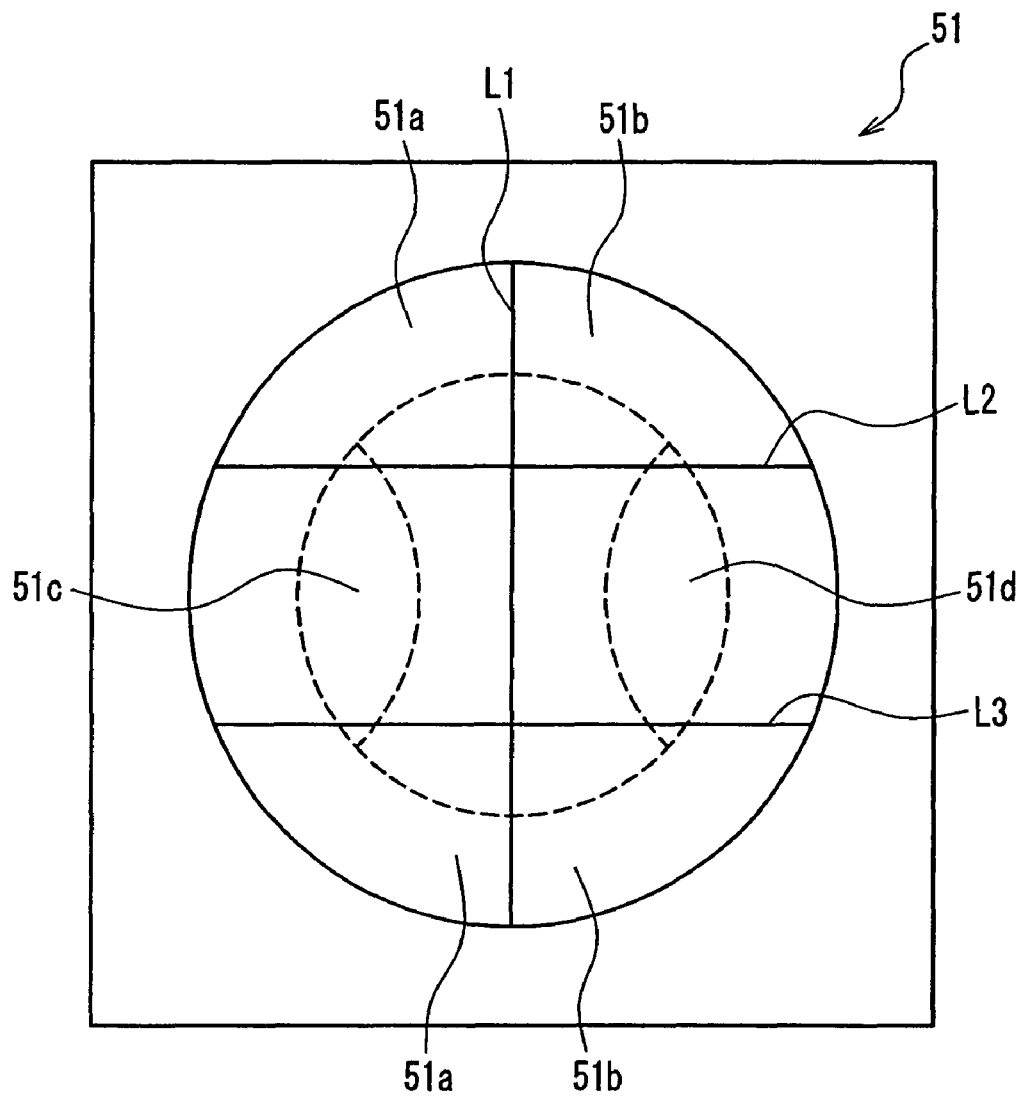
FIG. 2 is a diagram showing a pattern of a hologram of the optical head according to Embodiment 1.

FIG. 2 shows an example of the pattern of the hologram 51 according to Embodiment 1. The dashed lines in the drawing indicate the fluxes of laser light that pass through the hologram.

As shown in FIG. 2, the hologram 51 is divided into six regions by a first splitting line L1 that is substantially parallel to the direction of the information tracks of the optical disk 6 (the border of a region 51a and a region 51b, and of a region 51c and a region 51d), and second and third splitting lines L2 and L3 that are substantially perpendicular to the first splitting line L1 and that are substantially symmetrical about the optical axis of the objective lens 5 (the border of the region 51a and the region 51c, and of the region 51b and the region 51d).

Thus, the hologram 51 is divided into a plurality of regions 51a to 51d, with the border being between the parts that include a push pull component and the parts that do not.

Figure 3:
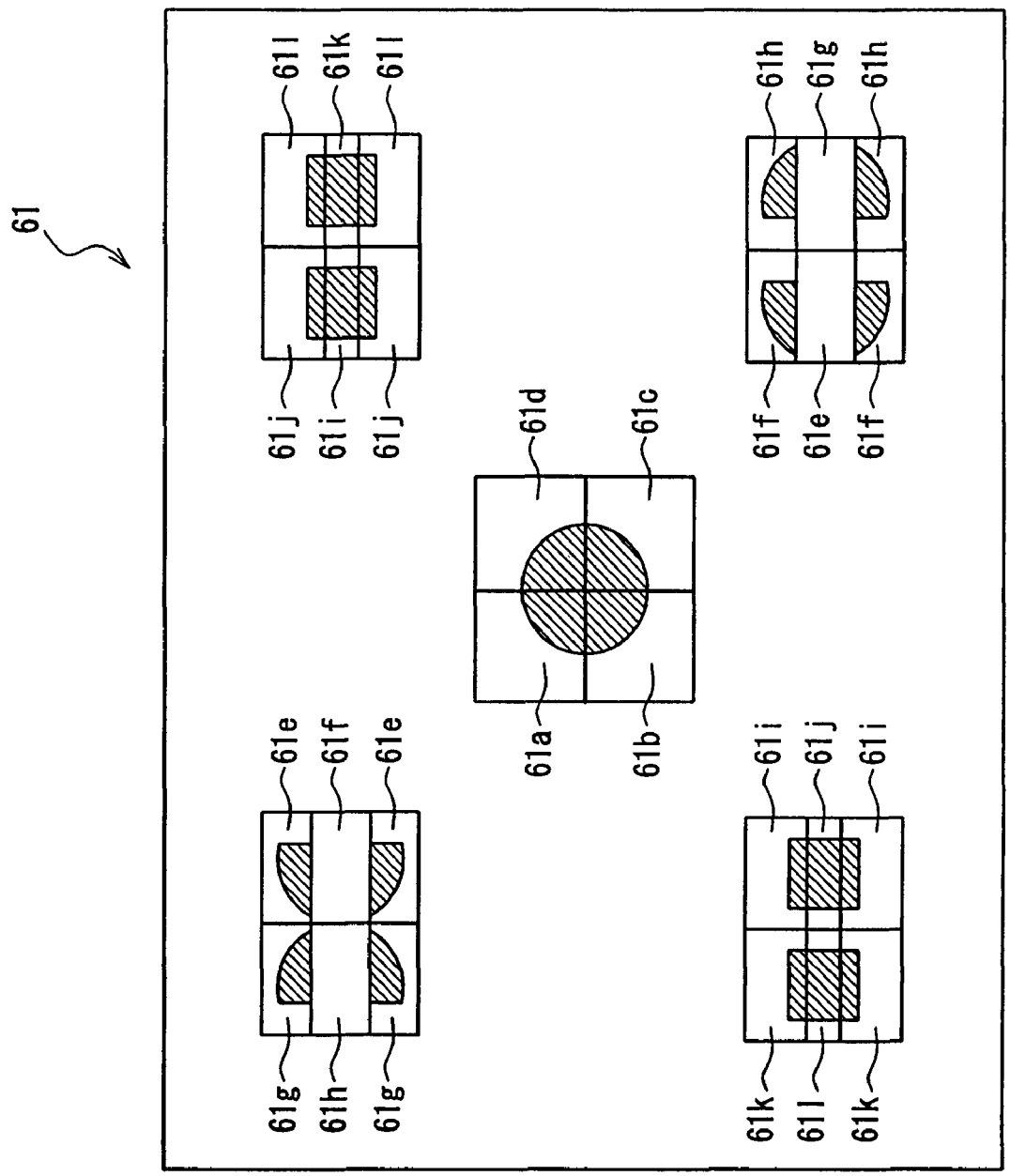
FIG. 3 is a diagram showing a pattern of a photodetector of the optical head according to Embodiment 1.

FIG. 3 shows the pattern of the photodetector 61 according to Embodiment 1. A plurality of light receiving regions 61a to 61l is disposed on the photodetector 61.

±1-order light that has passed through the region 51a of the hologram 51 (the region outside the second and third splitting lines L2 and L3) is incident on the light receiving region 61e and the light receiving region 61f of the photodetector 61. ±1-order light that has passed through the region 51b of the hologram 51 (the region outside the second and third splitting lines) is incident on the light receiving region 61g and the light receiving region 61h of the photodetector 61. ±1-order light that has passed through the region 51c of the hologram 51 (one of the two regions between the second and third splitting lines) is incident on the light receiving region 61i and the light receiving region 61j of the photodetector 61. ±1-order light that has passed through the region 51d of the hologram 51 (the other of the two regions between the second and third splitting lines) is incident on the light receiving region 61k and the light receiving region 61l of the photodetector 61.

Furthermore, 0-order light, whose light fluxes all pass through, is focused on the quarter regions 61a to 61d of the photodetector 61. It should be noted that +1-order light is focused on the light receiving regions on the right side, and −1-order light is focused on the light receiving regions on the left side.

+1-order light that passes through the regions 51a to 51d of the hologram 51 is focused on points that are further than the light receiving surface of the photodetector 61, −1-order light is focused on points that are closer than the light receiving surface of the photodetector 61, and furthermore, when the optical disk 6 is at the focal point of the objective lens 5, the grating pattern of the hologram 51 is given the refracting power of a lens such that the sizes of the light fluxes of the ±1-order light on the light receiving surface of the photodetector 61 are substantially equal. In this manner, the sizes of the light fluxes of the ±1-order light on the light receiving surface of the photodetector 61 changes such that the sizes are all different, depending on the focal point shift of the objective lens 5.

A focus error signal FE is obtained by:

Focus error signal FE=signal obtained by the light receiving region 61e+signal obtained by the light receiving region 61g+signal obtained by the light receiving region 61i+signal obtained by the light receiving region 61k−(signal obtained by the light receiving region 61f+signal obtained by the light receiving region 61h+signal obtained by the light receiving region 61j+signal obtained by the light receiving region 61l).

Furthermore, a push pull signal TE1 is obtained by:

Push pull signal TE1=signal obtained by the light receiving region 61i+signal obtained by, the light receiving region 61j−(signal obtained by the light receiving region 61k+signal obtained by the light receiving region 61l).

Here, if the objective lens 5 moves in the direction perpendicular to the information tracks (radial direction), an offset is generated in the push pull signal TE1, but using a correction signal TE2 that does not include a push pull component, TE2=signal obtained by the light receiving region 61e+ signal obtained by the light receiving region 61f−(signal obtained by the light receiving region 61g+signal obtained by the light receiving region 61h), it is possible to obtain a tracking error signal TE in which the offset caused by movement of the objective lens 5 is corrected.

Tracking error signal TE=TE1−k1×TE2, where k1 is a correction coefficient. The correction coefficient "k1" is determined such that movement of the objective lens 5 within a predetermined range does not generate an offset in the tracking error signal TE.

Next, a method for detecting spherical aberration according to the present embodiment is described below.

Because the regions 51a and 51b, and the regions 51c and 51d of the hologram 51 are respective different distances from the optical axis, if spherical aberration occurs, then their focal positions differ. Consequently, by comparing a focus error signal SAE1 obtained from the light fluxes of the region 51a and the region 51b of the hologram 51, and a focus error signal SAE2 obtained from the light fluxes of the region 51c and the region 51d, spherical aberration detection signals SAE1 and SAE2 that express the size and direction of the generated spherical aberration can be obtained.

Spherical aberration detection signal SAE1=signal obtained by the light receiving region 61e+signal obtained by the light receiving region 61g−(signal obtained by the light receiving region 61f+ signal obtained by the light receiving region 61h), and spherical aberration detection signal SAE2=signal obtained by the light receiving region 61i+signal obtained by the light receiving region 61k−(signal obtained by the light receiving region 61j+ signal obtained by the light receiving region 61l).

Figure 4B:
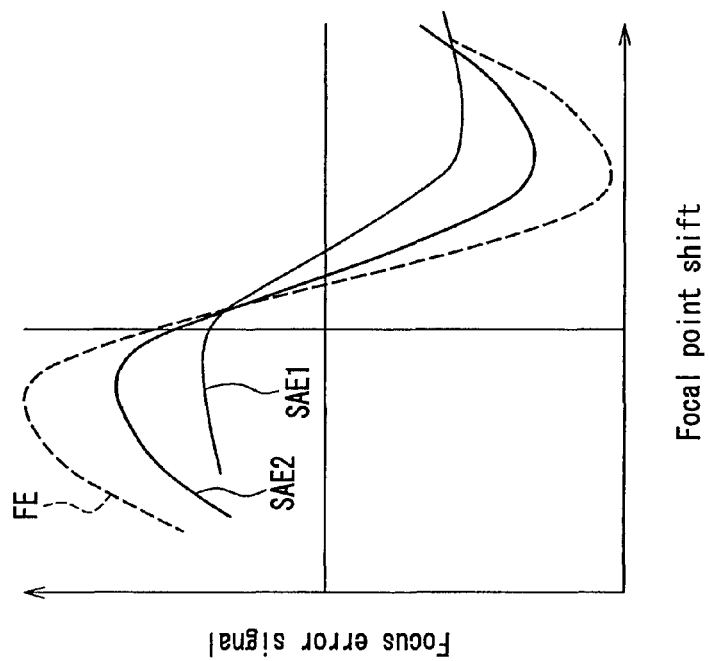
FIG. 4A and FIG. 4B are graphs that schematically show the change in the focus error signal with respect to the focal point shift of the objective lens.
Figure 4A:
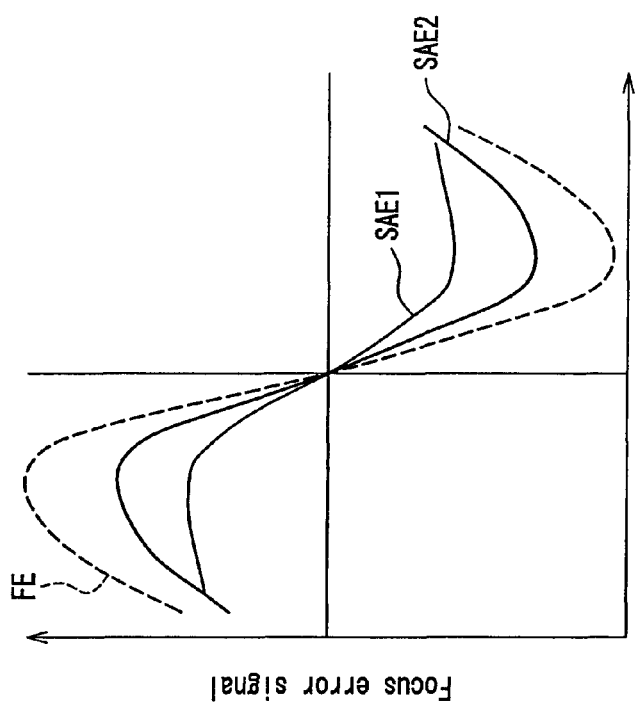

FIG. 4A is a graph schematically showing the change in the focus error signal FE, the focus error signal SAE1 and the focus error signal SAE2 with respect to focal point shift of the objective lens 5, for a state in which there is no spherical aberration. In a state in which there is no spherical aberration, the zero crossing points of the three focus error signals coincide.

It should be noted that as shown in FIG. 4A, usually, the amplitude and slope of the focus error signal SAE1 and those of the focus error signal SAE2 are different from each other.

FIG. 4B is a graph schematically showing the change in the focus error signal FE, the focus error signal SAE1 and the focus error signal SAE2 with respect to focal point shift of the objective lens 5, for a state in which there is spherical aberration.

As shown in FIG. 4B, if spherical aberration has occurred, the focus error signals shift, but there is a difference in the shift amount of the focus error signal FE, the focus error signal SAE1 and the focus error signal SAE2. The difference in the shift amount of the focus error signal FE, the focus error signal SAE1 and the focus error signal SAE2 increases in accordance with an increase in spherical aberration.

Figure 5:
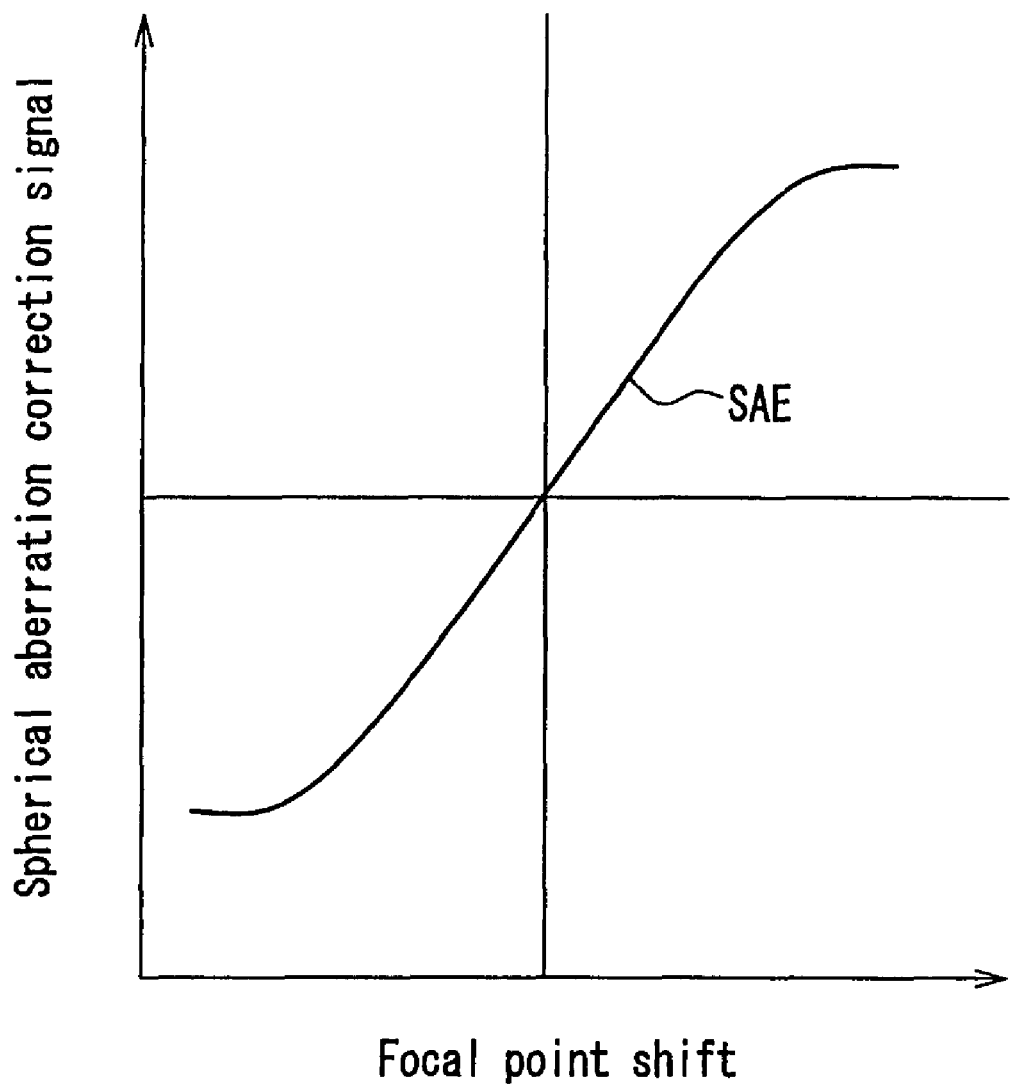
FIG. 5 is a graph showing the change in a spherical aberration correction signal when a focus error signal is zero.

The spherical aberration correction signal SAE is obtained by the following formula:

$$SAE=SAE2-k2 \times SAE1,$$

where k2 is a correction coefficient. FIG. 5 illustrates the change in the spherical aberration correction signal SAE when spherical aberration occurs, and when the focus error signal FE=0. Since the spherical aberration correction signal SAE is a signal that depends on the size and direction of the spherical aberration, depending on the size and direction of the spherical aberration correction signal detected by the spherical aberration detector 10, it is possible to alter the phase of the wavefront of the laser light passing through the liquid crystal element 20 to correct spherical aberrations by adjusting the voltage that the spherical aberration corrector 11 applies to the liquid crystal element 20. If the liquid crystal element 20 is used, then spherical aberration can be corrected without using a drive mechanism such as an actuator, which makes it suitable for compact optical heads.

Figure 6B:
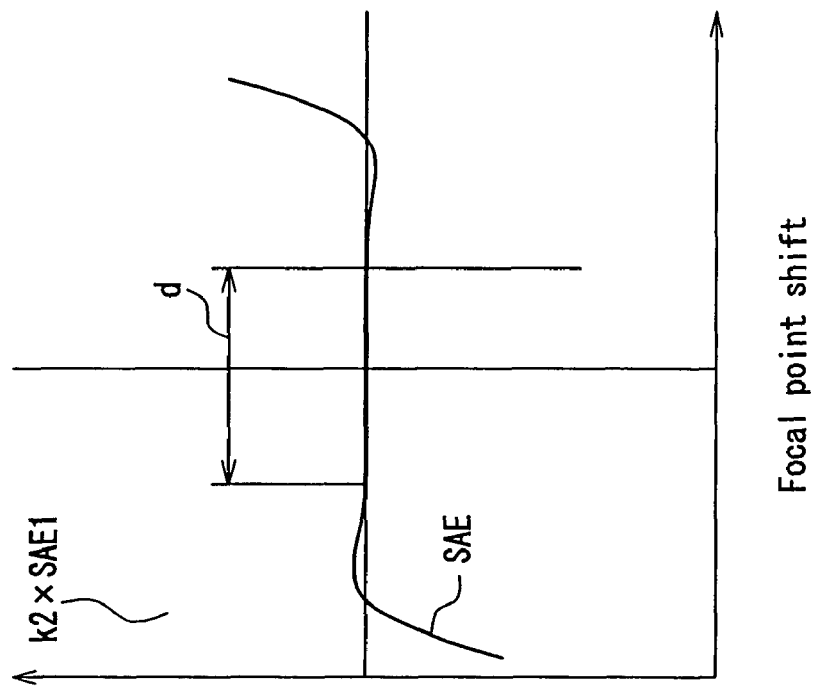
FIG. 6A and FIG. 6B are graphs illustrating a method for setting a correction coefficient "k2".
Figure 6A:
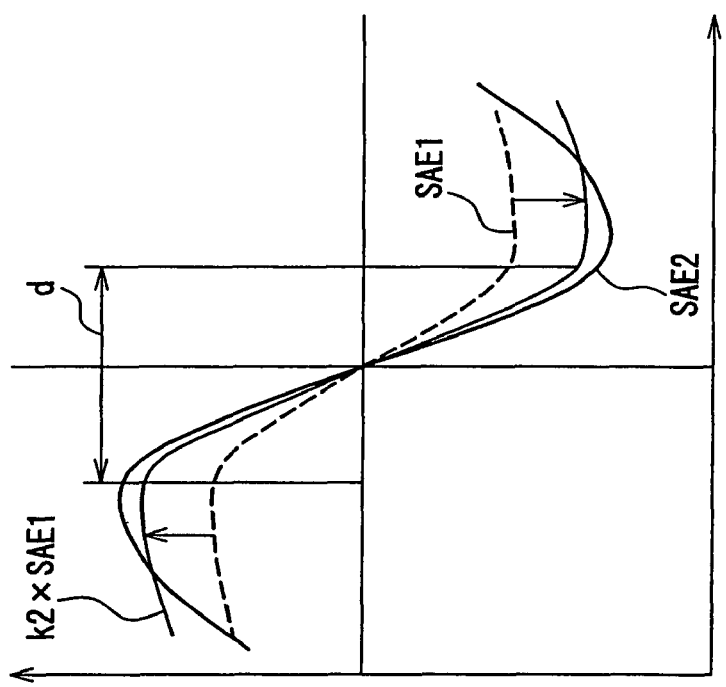

Thus, as shown in FIG. 6A, it is preferable to set the coefficient "k2" such that in the state in which spherical aberration does not occur, the slope of the focus error signal SAE2 and that of the focus error signal SAE1×k2 are substantially equal (satisfying k2=SAE2/SAE1 in a predetermined range "d" centered on the focal point).

In this case, as shown in FIG. 6B, in the state in which spherical aberration does not occur, even if there is focal point shift of the objective lens 5, then (in the predetermined range "d") the spherical aberration correction signal SAE is substantially zero. That is to say, since the spherical aberration correction signal SAE is not influenced by the focal point shift, the accuracy of the spherical aberration correction can be improved.

Figure 7:
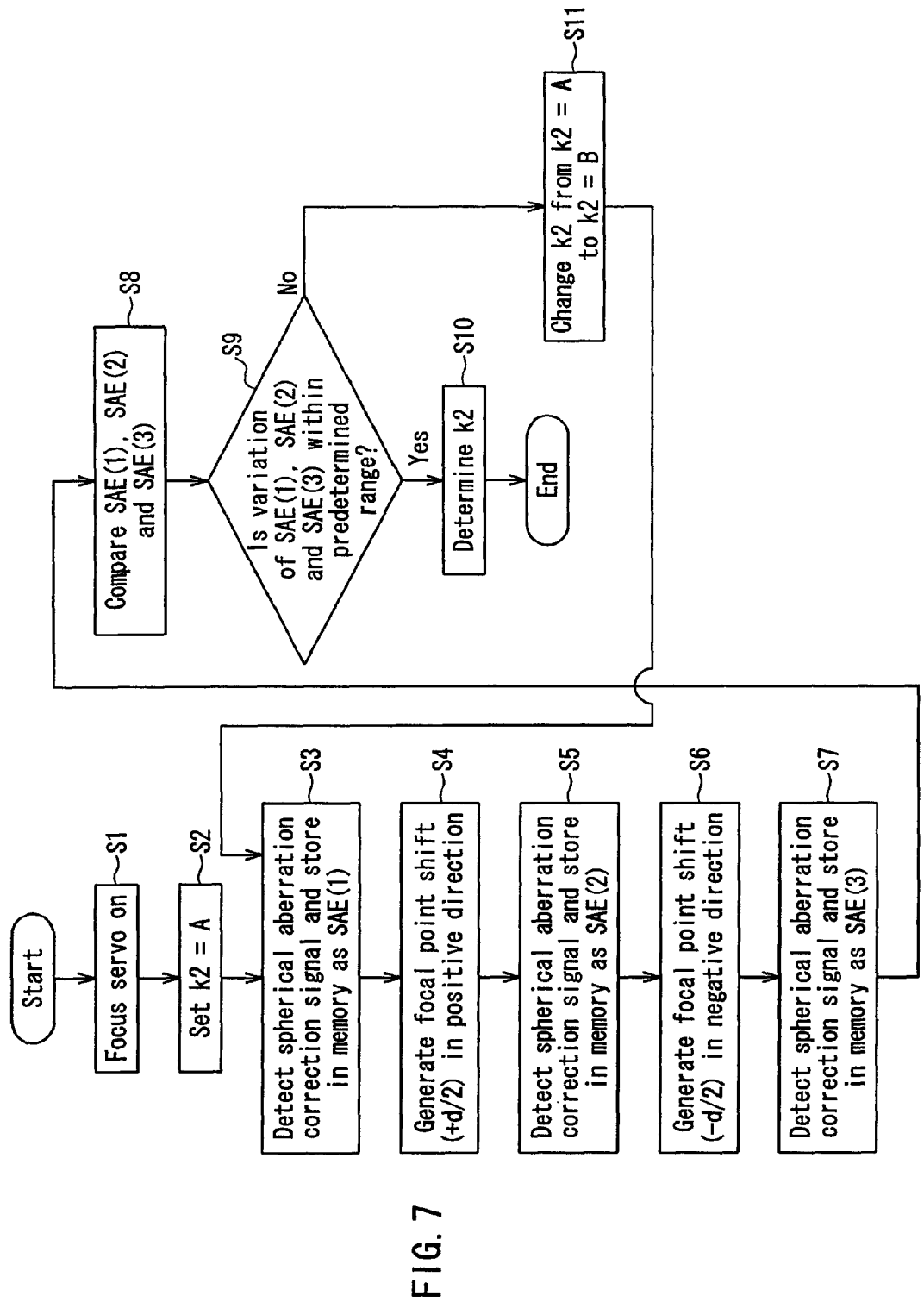
FIG. 7 is a flowchart showing a procedure to determine the spherical aberration detection signal according to Embodiment 1.

Here, a more specific method for determining the correction coefficient "k2" of the optical disk device that is provided with the optical head according to the present embodiment is described with reference to FIG. 7.

First, a focus servo is turned on (step S1). Then, in accordance with a signal calculated in the focus error detector 12, the objective lens actuator 14 drives the objective lens 5 and focuses laser light onto the recording and reproduction information surface of the optical disk 6. Next, a predetermined value "A" is set to the correction coefficient "k2" (step S2).

After this, with the predetermined value A, the spherical aberration detection signal SAE in the case when the correction coefficient "k2" is set in advance to k2=A, is obtained by calculation of $$SAE=SAE2-(k2 \times SAE1),$$

and is stored in the memory as SAE(1) (step S3).

Next, an electrical offset is added to the signal calculated in the focus error detector 12, and a predetermined amount (for example, +d/2, which is half the range "d" shown in FIG. 6A and FIG. 6B) of focal point shift is generated (step S4). After this, the spherical aberration detection signal SAE at this time is stored in the memory as SAE(2) (step S5).

In a similar manner, an opposite electrical offset is added to the signal calculated in the focus error detector 12, and a predetermined amount (for example, −d/2) of focal point shift is generated (step S6). Then, the spherical aberration detection signal SAE at this time is stored in the memory as SAE(3) (step S7).

The spherical aberration detection signal SAE(1) calculated with no focal point shift, the spherical aberration detection signal SAE(2) calculated with a focal point shift of +d/2 and the spherical aberration detection signal SAE(3) calculated with a focal point shift of −d/2, stored in the memory, are compared (step S8) and the variance of the spherical aberration detection signals SAE(1), SAE(2) and SAE(3) are judged as to whether they are within a predetermined range or not (step S9).

When the variance of the spherical aberration detection signals SAE(1), SAE(2) and SAE(3) is judged to be within the predetermined range (YES in step S9), the correction coefficient is set to k2=A (step S10). When the variance of the spherical aberration detection signals SAE(1), SAE(2) and SAE(3) is judged not to be within the predetermined range (NO in step S9), the correction coefficient is set to k2=B, where the value "B" differs from the predetermined value "A" (step S11), and the procedure returns to step S3, to obtain again the spherical aberration detection signals SAE(1) to SAE(3). In this case, it is preferable that the value "B" is determined in accordance with the direction and amount of the variance of the spherical aberration detection signals SAE (1) to SAE(3). If the variance of the spherical aberration detection signals SAE(1) to SAE(3) moves into the predetermined range due to the value "B", then it is possible to set the correction coefficient k2=B. If they do not move into the predetermined range, then the spherical aberration detection signals SAE(1) to SAE(3) are obtained with the correction coefficient k2=C, where the value C is yet another value.

By using such a procedure, it is possible to set the correction coefficient k2 such that the spherical aberration detection signal SAE is less affected by the influence of focal point shift.

It should be noted that for correcting spherical aberration, apart from using the liquid crystal element 20 shown in FIG. 1, it is possible to drive the collimator lens 4 in the optical axis direction of the laser light to correct spherical aberration. By moving the collimator lens 4 in the direction of the light source (the semiconductor laser 1), the light emitted from the collimator lens 4 changes from parallel light to diverging light, and by moving the collimator lens 4 in the direction of the objective lens 5, the light emitted from the collimator lens 4 changes from parallel light to converging light.

Because changing the laser light incident on the objective lens 5 to either diverging light or converging light generates spherical aberration, by generating spherical aberration in a direction opposite to the spherical aberration caused by changes in the substrate thickness of the optical disk 6, it is possible to cancel out the spherical aberration. For example, it is possible to cancel out spherical aberration that occurs when the substrate thickness of the optical disk 6 is thicker by setting the laser light incident on the objective lens 5 to be diverging light, and conversely, it is possible to cancel out spherical aberration that occurs when the substrate thickness of the optical disk 6 is thinner by setting the laser light incident on the objective lens 5 to be converging light.

Figure 8A:
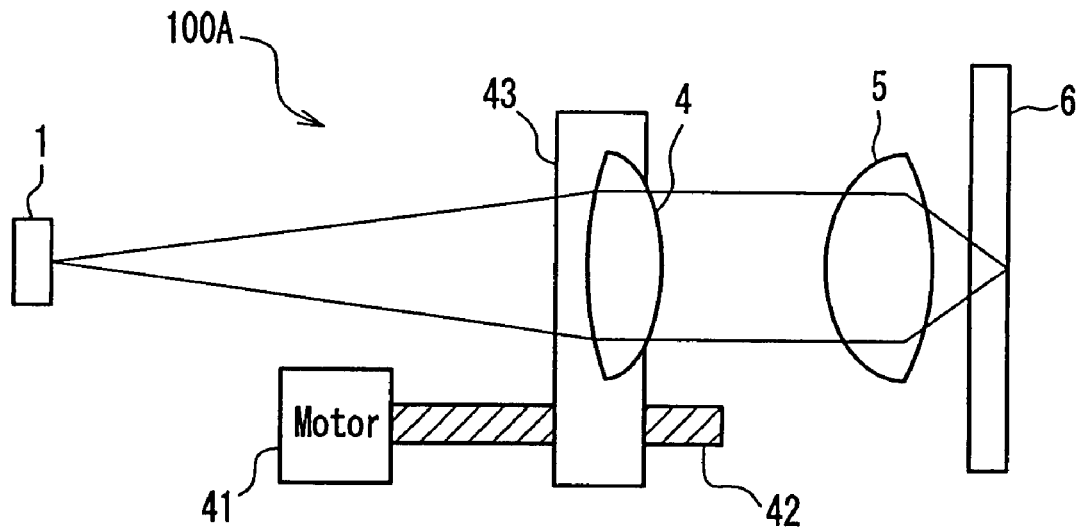
FIG. 8A and FIG. 8B are structural overviews showing another spherical aberration correction means according to Embodiment 1.

FIG. 8A shows a structural overview of an optical head 100A of another embodiment, containing a mechanism to drive the collimator lens 4 in the direction of the optical axis of the laser light. In FIG. 8A, numeral 1 denotes a semiconductor laser, numeral 4 denotes a collimator lens, numeral 5 denotes an objective lens, numeral 6 denotes an optical disk, numeral 41 denotes a motor, numeral 42 denotes a shaft and numeral 43 denotes a lens holder. Driving the motor 41 rotates the shaft 42, and the collimator lens 4 and the lens holder 43 that holds the collimator lens 4 are capable of moving in the direction of the optical axis of the laser light.

Thus, it is possible to drive the motor 41 in response to the size and direction of the spherical aberration correction signal SAE such that the spherical aberration SAE signal is zero, and by changing the position of the collimator lens 4, which is held in the lens holder 43, in the direction of the optical axis, it is possible to correct spherical aberration.

Figure 8B:
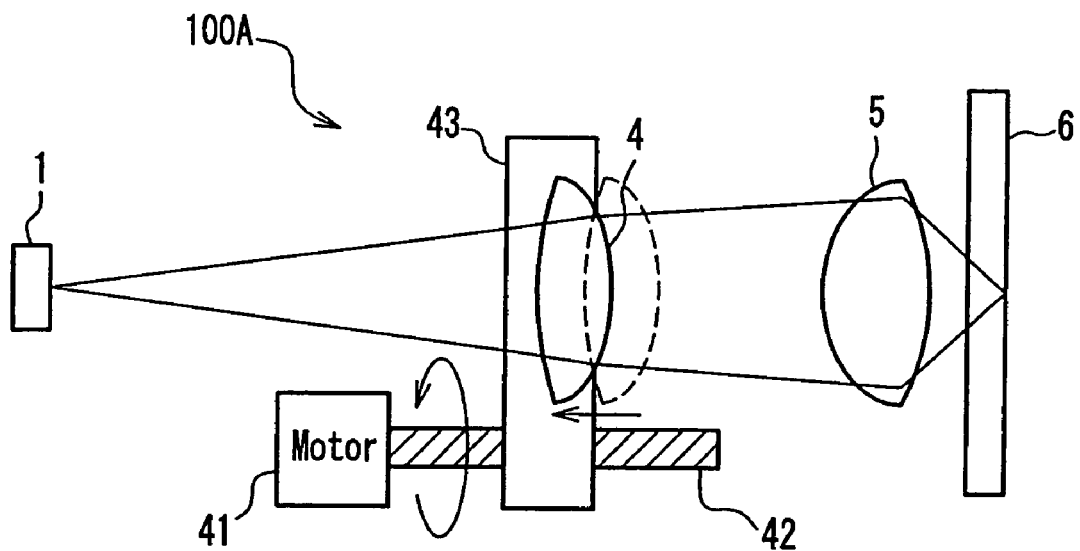

As shown in FIG. 8B, by moving the collimator lens 4 in the direction of the light source (semiconductor laser 1), the light that is emitted from the collimator lens 4 is diverging light, and this corrects the spherical aberration caused when the substrate of the optical disk 6 is thicker.

It should be noted that means for driving the collimator lens 4 in the direction of the optical axis of the laser light are not limited to the above-mentioned method that uses a motor, and it goes without saying that any means is possible, such as an actuator driven by a magnetic circuit or a piezoelectric element.

If spherical aberration is corrected by driving the collimator lens as above, since there is less loss of the laser light used in recording and reproduction than when the liquid crystal element 20 is used, there is the advantage in that loss of the light utilization efficiency can be suppressed.

Figure 9:
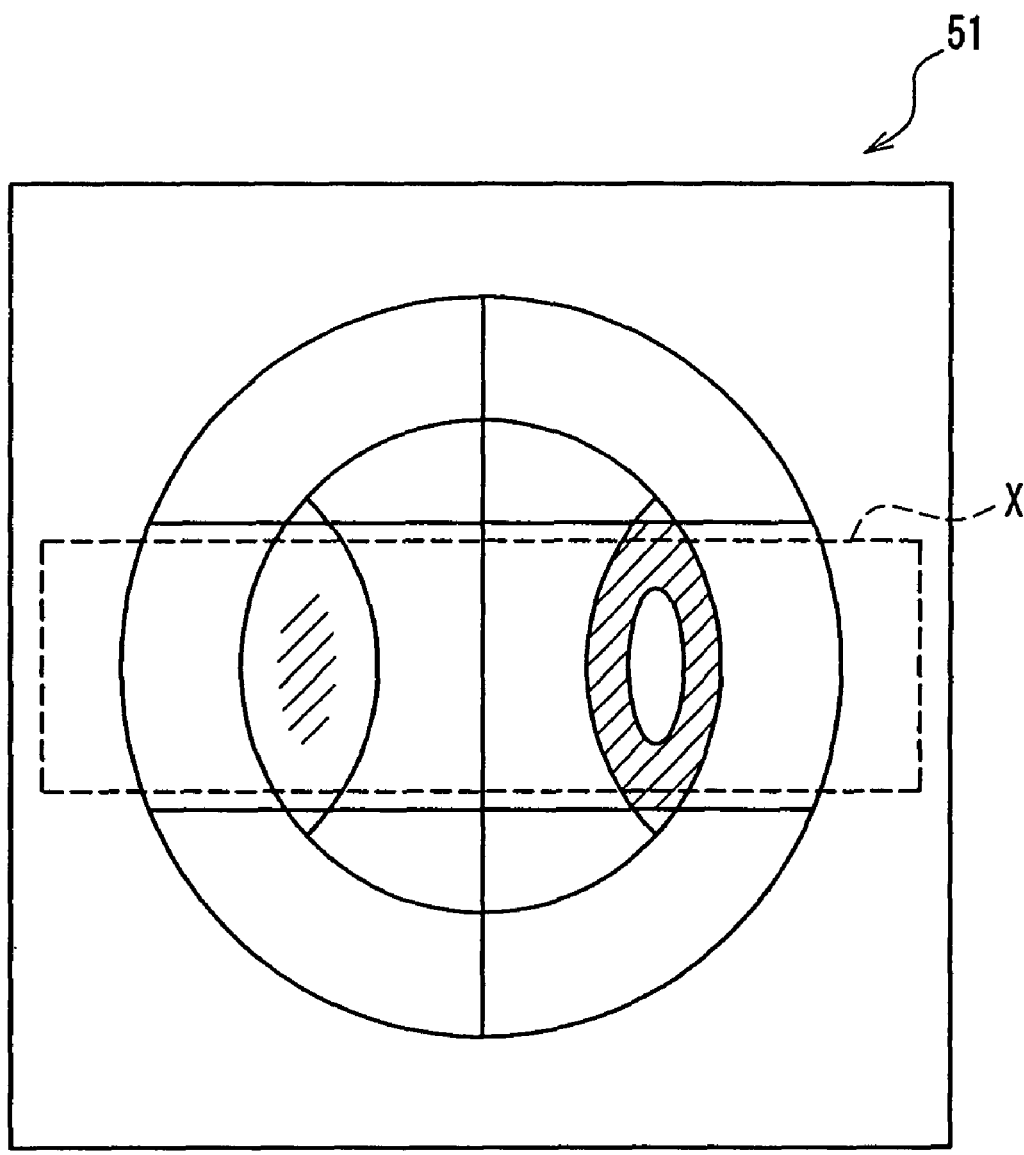
FIG. 9 is a diagram schematically showing the state of a light flux on the hologram when tilt occurs.

Next, a method to detect tilt, which is the relative inclination between the objective lens 5 and the optical disk 6, is described. FIG. 9 is a diagram schematically showing the state of the light fluxes on the hologram 51 when tilt has occurred. Because the inclination of the optical disk 6 is generated in the radial direction of the disk, that is to say, in a direction perpendicular to the information tracks, an imbalance is created in the quantity of light in the push pull signal. Since a phase shift is generated in the push pull signal when such an imbalance is created, if a tracking servo operation is performed using this push pull signal, then the zero crossing point of the tracking error signal and the center of the information track are offset, and what is known as an "off-track" occurs.

Because the effect of phase shift due to tilt appears more in the region centered on the optical axis (region X in FIG. 9), by comparing the phase of the push pull signal of the entire light flux to that of the push pull signal of the region X in the center of the light flux, the amount of tilt that is generated may be detected.

The push pull signal in the region X in the center of the light flux is TE1, which is expressed by:

TE1=signal obtained by the light receiving region $61i$+signal obtained by the light receiving region $61j$–(signal obtained by the light receiving region $61k$+signal obtained by the light receiving region $61l$). On the other hand, the push pull signal TE0 due to the entire light flux is detected in the regions $61a$ to $61d$ in which 0-order light is focused, and is expressed by:

TE0=signal obtained by the light receiving region $61a$+signal obtained by the light receiving region $61b$–(signal obtained by the light receiving region $61c$+signal obtained by the light receiving region $61d$). The phase difference between the push pull signal TE1 and the push pull signal TE0 is the amount of tilt that is generated.

It should be noted that because an offset is generated between the push pull signal TE1 and the push pull signal TE0 in accordance with the movement of the objective lens, for tilt detection, it is preferable to use signals that are corrected in accordance with a correction signal TE2 that does not include push pull components, that is to say:

a signal TE=TE1–$k1$×TE2, and a signal TE'=TE0–$k3$×TE2, ($k1$ and $k3$ are correction coefficients).

It should be noted that depending on the size and direction of the tilt that is detected, the spherical aberration corrector 11 may adjust the current driving the objective lens 5 to correct the relative tilt between the objective lens 5 and the optical disk 6.

Embodiment 2

Figure 10:
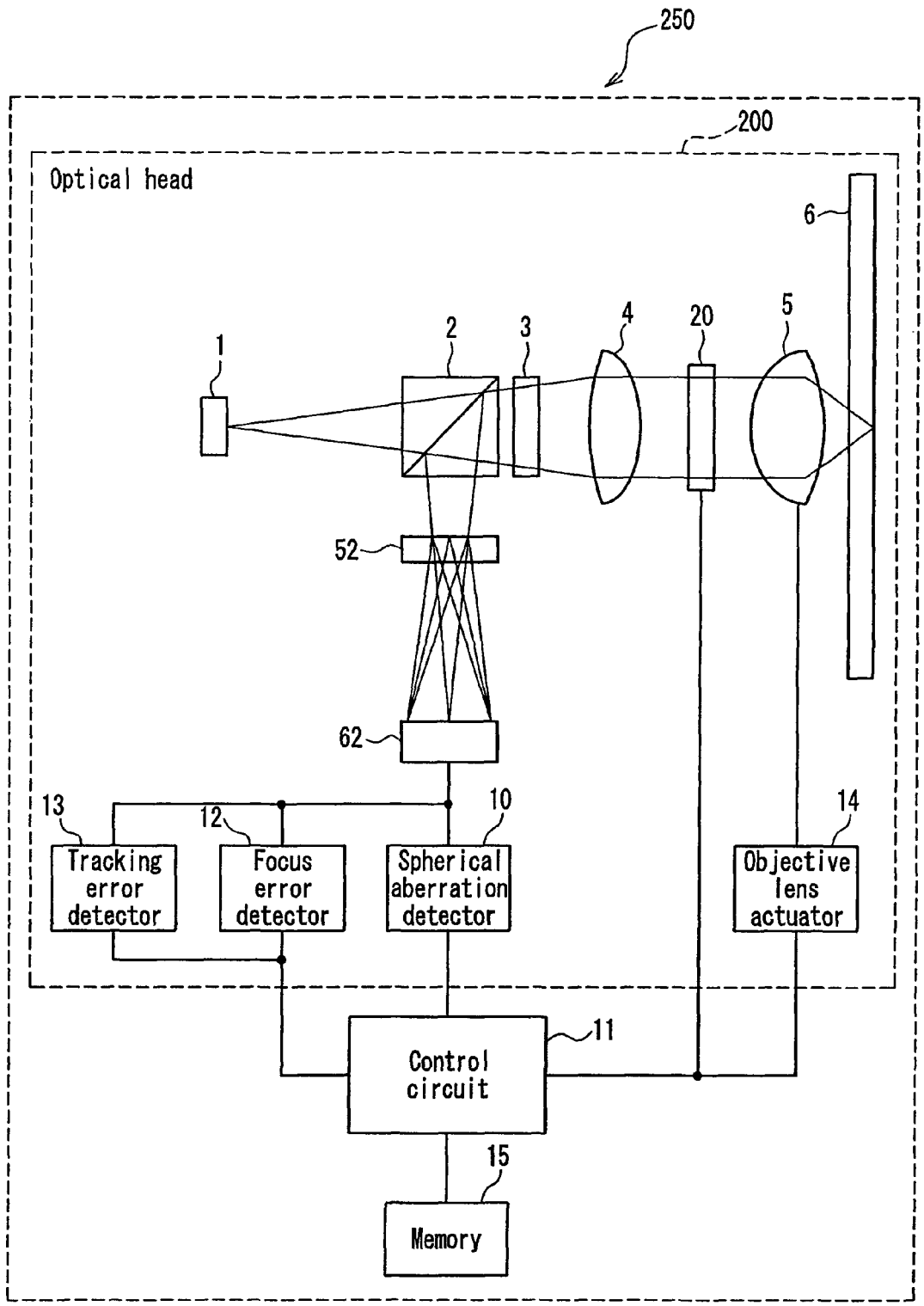
FIG. 10 is a structural overview of an optical head according to Embodiment 2.

FIG. 10 shows a structural overview of an optical disk device 250 according to another embodiment of the present invention. It should be noted that regarding structures that are the same as in Embodiment 1, the same reference numbers are used, and their description below is omitted. The optical disk device 250 includes an optical head 200, a control circuit 11 and a memory 15. In the optical head 200 of FIG. 10, numeral 52 denotes a hologram that corresponds to light splitting means and numeral 62 denotes a photodetector that corresponds to a light receiving element.

Figure 11:
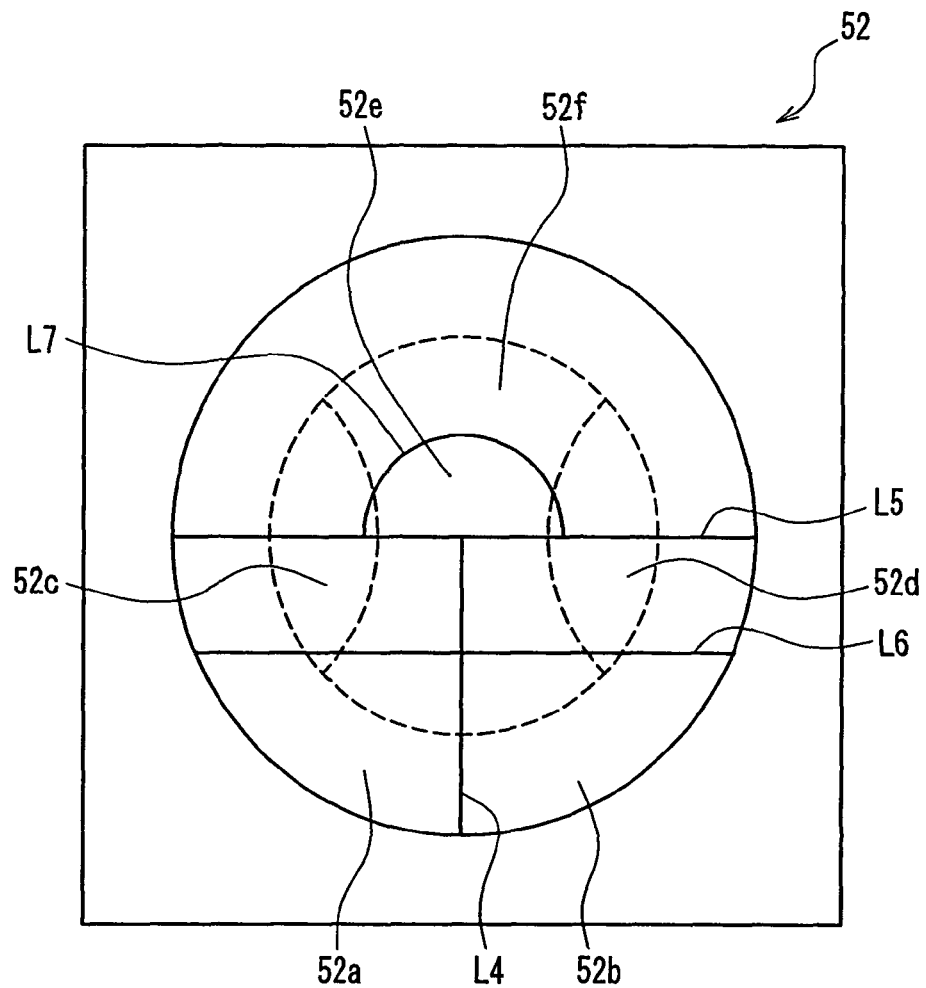
FIG. 11 is a diagram showing a pattern of a hologram of the optical head according to Embodiment 2.

FIG. 11 shows an example of a pattern of the hologram 52 according to Embodiment 2.

As shown in FIG. 11, the hologram 52 is divided into six regions by a first splitting line L4 that is substantially parallel to the direction of the information tracks of the optical disk 6 (border of a region $52a$ and a region $52b$, and of a region $52c$ and a region $52d$), a second splitting line L5 that is substantially perpendicular to the first splitting line L4 and that passes through the optical axis of the objective lens 5 (border of the regions $52c$ and $52d$ and regions $52e$ and $52f$), a third splitting line L6 that is substantially parallel to the second splitting line L5 (border of the region $52a$ and the region $52c$, and of the region $52b$ and the region $52d$) and a semicircle-shaped fourth splitting line L7 that is on the other side of the third splitting line L6 relative to the second splitting line L5, and that is centered on the optical axis of the objective lens 5 (border of the region $52e$ and the region $52f$).

Thus, the hologram 52 is divided into a plurality of regions $52a$ to $52f$.

Figure 12:
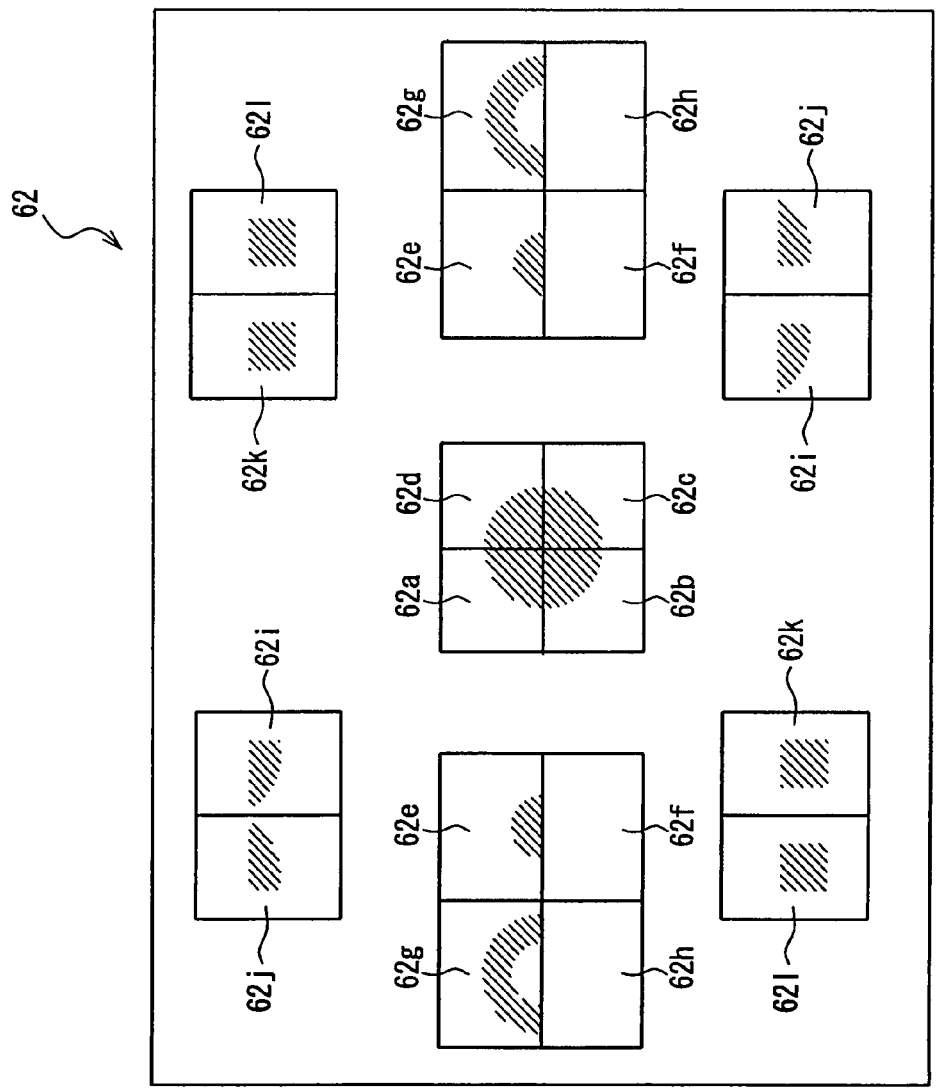
FIG. 12 is a diagram showing a pattern of a photodetector of the optical head according to Embodiment 2.

FIG. 12 shows a pattern of a photodetector 62 according to Embodiment 2. A plurality of regions $62a$ to $62l$ is disposed on the photodetector 62.

Thus, ±1-order light that passes through the region $52a$ of the hologram 52 (a region on the outer side of the third splitting line) is incident on the light receiving region $62i$ of the photodetector 62, ±1-order light that passes through the region $52b$ of the hologram 52 (a region on the outer side of the third splitting line) is incident on the light receiving region 62*j* of the photodetector 62, ±1-order light that passes through the region 52*c* of the hologram 52 (one of the two regions between the second and third splitting lines L5 and L6) is incident on the light receiving region 62*k* of the photodetector 62 and ±1-order light that passes through the region 52*d* of the hologram 52 (the other of the two regions between the second and third splitting lines L5 and L6) is incident on the light receiving region 62*l* of the photodetector 62.

±1-order light that passes through the region 52*e* of the hologram 52 (the region between the second and fourth splitting lines L5 and L7) is incident on the light receiving regions 62*e* and 62*f* of the photodetector 62, divided into two and ±1-order light that passes through the region 52*f* of the hologram 52 (the region on the outer side of the fourth splitting line L5) is incident on the light receiving regions 62*g* and 62*h* of the photodetector 62, divided into two.

Furthermore, 0-order light, of which all light fluxes pass through, is focused on the regions 62*a* to 62*d* of the photodetector 62, divided into four.

It should be noted that the ±1-order light of the regions 52*e* and 52*f* of the hologram 52 is formed such that when the optical disk 6 is at the focal point of the objective lens 5, the areas of light emitted onto the light receiving regions 62*e* and 62*f*, and 62*g* and 62*h* are equal, respectively. That is to say that the grating pattern on the hologram 52 is set such that the respective values of the electrical signal obtained from the light receiving region 62*e*, the electrical signal obtained from the light receiving region 62*f*, the electrical signal obtained from the light receiving region 62*g* and the electrical signal obtained from the light receiving region 62*h* are equal. When set in such a way, the power output from the light receiving regions 62*e*, 62*f*, 62*g* and 62*h* of the photodetector 62 changes in accordance with the focal point shift of the objective lens 5. It should be noted that FIG. 12 expresses the manner in which the focal point shift occurs, and ±1-order light is incident only on the regions 62*e* and 62*g*.

The focus error signal FE is obtained by:

FE=signal obtained by the light receiving region 62*e*+
signal obtained by the light receiving region
62*g*−(signal obtained by the light receiving
region 62*f*+signal obtained by the light receiving
region 62*h*).

Furthermore, the push pull signal TE1 is obtained by:

TE1=signal obtained by the light receiving region
62*k*+signal obtained by the light receiving region
62*l*.

Here, if the objective lens 5 moves in the direction perpendicular to the information tracks, an offset is generated in the push pull signal TE1, but using a correction signal TE2 that does not include a push pull component, TE2=signal obtained by the light receiving region 62*i*−signal obtained by the light receiving region 62*j*, it is possible to obtain a tracking error signal TE in which the offset caused by movement of the objective lens 5 is corrected.

TE=TE1−k1×TE2, where k1 is a correction coefficient. The correction coefficient "k1" is determined such that movement of the objective lens 5 within a predetermined range does not generate an offset in the tracking error signal TE.

A method for detecting spherical aberration according to the present embodiment is described below.

Because the region 52*e* and the region 52*f* of the hologram 52 are different respective distances from the optical axis, their focusing positions differ when spherical aberration occurs. Consequently, by comparing the focus error signal SAE1, obtained from light fluxes passing through the region 52*e* to the focus error signal SAE2 obtained from light fluxes passing through the region 52*f*, it is possible to obtain a spherical aberration error signal SAE that expresses the size and direction of the spherical aberration that occurs.

SAE1=signal obtained by the light receiving region
62*e*−signal obtained by the light receiving region
62*f*, SAE2=signal obtained by the light receiving region
62*g*−signal obtained by the light receiving region
62*h*, and SAE=SAE2−k2×SAE1, where k2 is a correction coefficient. As was described in Embodiment 1, it is preferable that the correction coefficient k2 is set such that the slope of the focus error signal SAE1 when in a state in which there is no spherical aberration, and the slope of the focus error signal SAE2×k2 are substantially equal (the expression k2=SAE2/SAE1 is satisfied on a predetermined range "x" centered on the focal point).

It should be noted that depending on the size and direction of the spherical aberration that is detected, the spherical aberration corrector 11 adjusts the voltage applied to the liquid crystal element 20 to correct the spherical aberration. Furthermore, as described in Embodiment 1, it is possible to correct the spherical aberration by driving the collimator lens 4 in the direction of the optical axis of the laser light.

Next, the method for detecting tilt, which is the relative inclination of the between the objective lens 5 and the optical disk 6, is described. Because the effect of phase shift due to tilt appears mainly in regions centered around the optical axis, it is possible to determine the amount of tilt that is generated by comparing the push pull signal of the entire light flux to the push pull signal of the central region of the light flux.

The push pull signal of the central region of the light flux is TE1, and this is expressed by:

TE1=signal obtained by the light receiving region
62*k*−signal obtained by the light receiving region
62*l*.

On the other hand, the push pull signal TE0 of the entire light flux is detected by the regions 62*a* to 62*d* in which 0-order light is focused, and is expressed by:

TE0=signal obtained by the light receiving region
62*a*+signal obtained by the light receiving region
62*b*−(signal obtained by the light receiving
region 62*c*+signal obtained by the light receiving
region 62*d*).

The phase difference between the push pull signal TE1 and the push pull signal TE0 is the amount of tilt that is generated.

It should be noted that since offset is generated in the push pull signal TE1 and the push pull signal TE0 in accordance with movement of the objective lens, for detecting tilt, it is preferable that these are corrected by using correction signals TE2 that do not include the respective push pull components:

TE=TE1−k1×TE2, and

TE'=TE0−k3×TE2, (where k1 and k3 are correction coefficients).

It should be noted that depending on the size and direction of the tilt that is detected, the spherical aberration corrector 11 can adjust the current driving the objective lens 5 to correct the relative inclination between the objective lens 5 and the optical disk 6.

Embodiment 3

Figure 13:
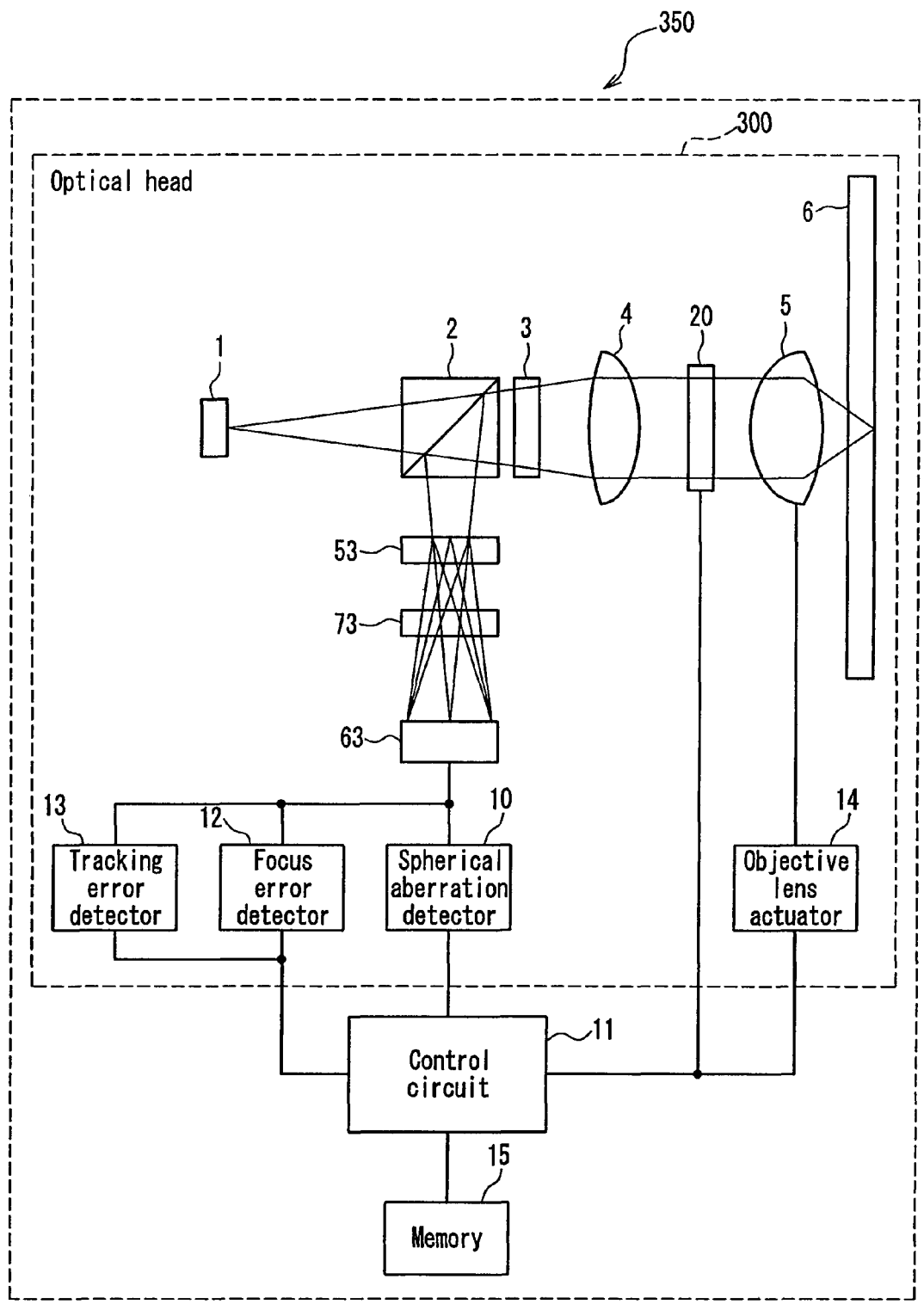
FIG. 13 is a structural overview of an optical head according to Embodiment 3.

FIG. 13 shows a structural overview of an optical disk device 350 of another embodiment of the present invention. It should be noted that regarding structures that are the same as in Embodiment 1, the same reference numbers are used, and their description below is omitted. The optical disk device 350 includes an optical head 300, a control circuit 11 and a memory 15.

In the optical head 300 shown in FIG. 13, numeral 53 denotes a hologram that corresponds to a light splitting means, numeral 63 denotes a photodetector that corresponds to a light receiving element, and numeral 73 denotes an anamorphic lens that applies an astigmatism to light fluxes created by laser light passing through the hologram 53.

Figure 14:
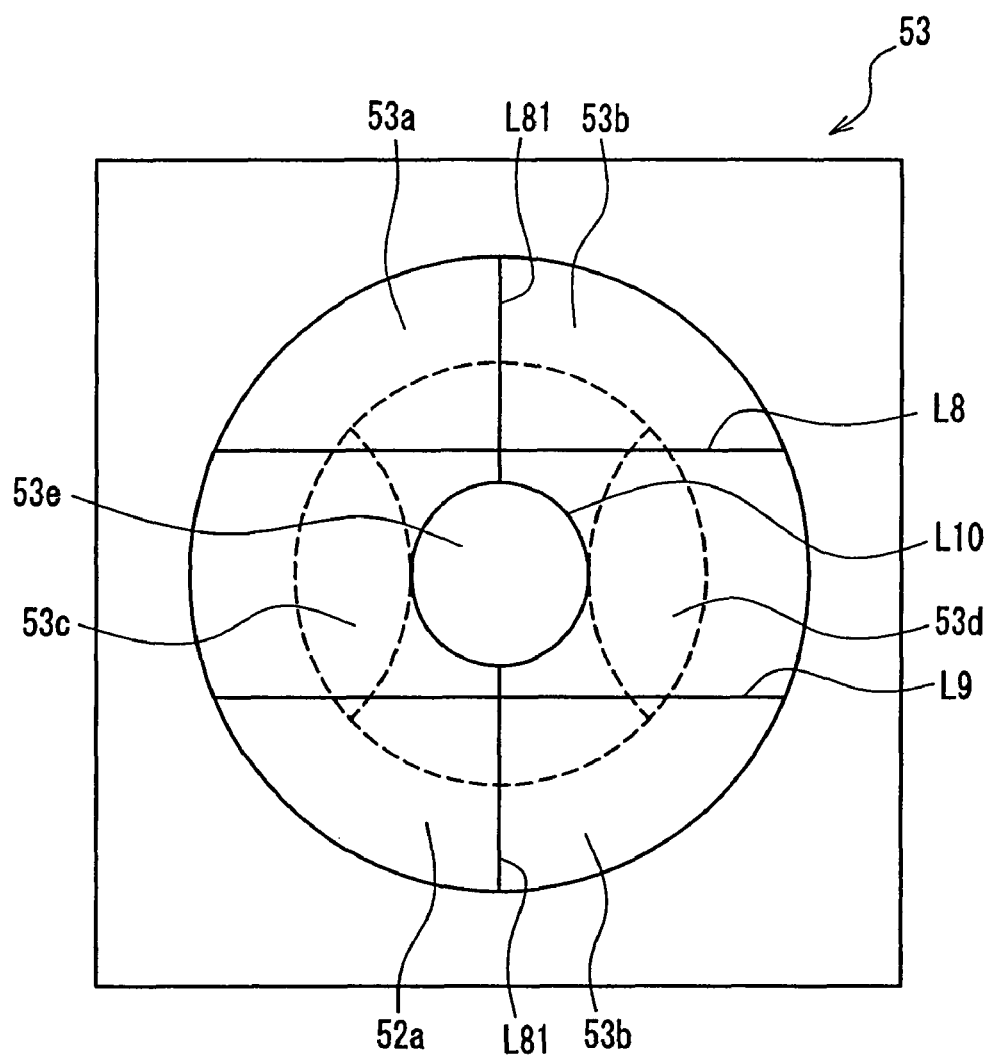
FIG. 14 is a diagram showing a pattern of a hologram of the optical head according to Embodiment 3.

FIG. 14 shows an example of a pattern of the hologram 53 according to the present embodiment. As shown in FIG. 14, the hologram 53 is divided into seven regions by a first splitting line L81 that is substantially parallel to the direction of the information tracks on the optical disk 6 (border of a region 53*a* and a region 53*b*, and of a region 53*c* and a region 53*d*), second and third splitting lines L8 and L9 that are substantially perpendicular to the first splitting line L81 and are substantially symmetrical about the optical axis of the focusing optical system (border of the region 53*a* and the region 53*c*, and of the region 53*b* and the region 53*d*) and a circle-shaped fourth splitting line L10 that is positioned between the second and third splitting lines L8 and L9 and centered on the optical axis of the focusing optical system (border of the regions 53*c* and 53*d* and a region 53*e*).

Thus, the hologram 53 is divided into a plurality of regions 53*a* to 53*e*.

Figure 15:
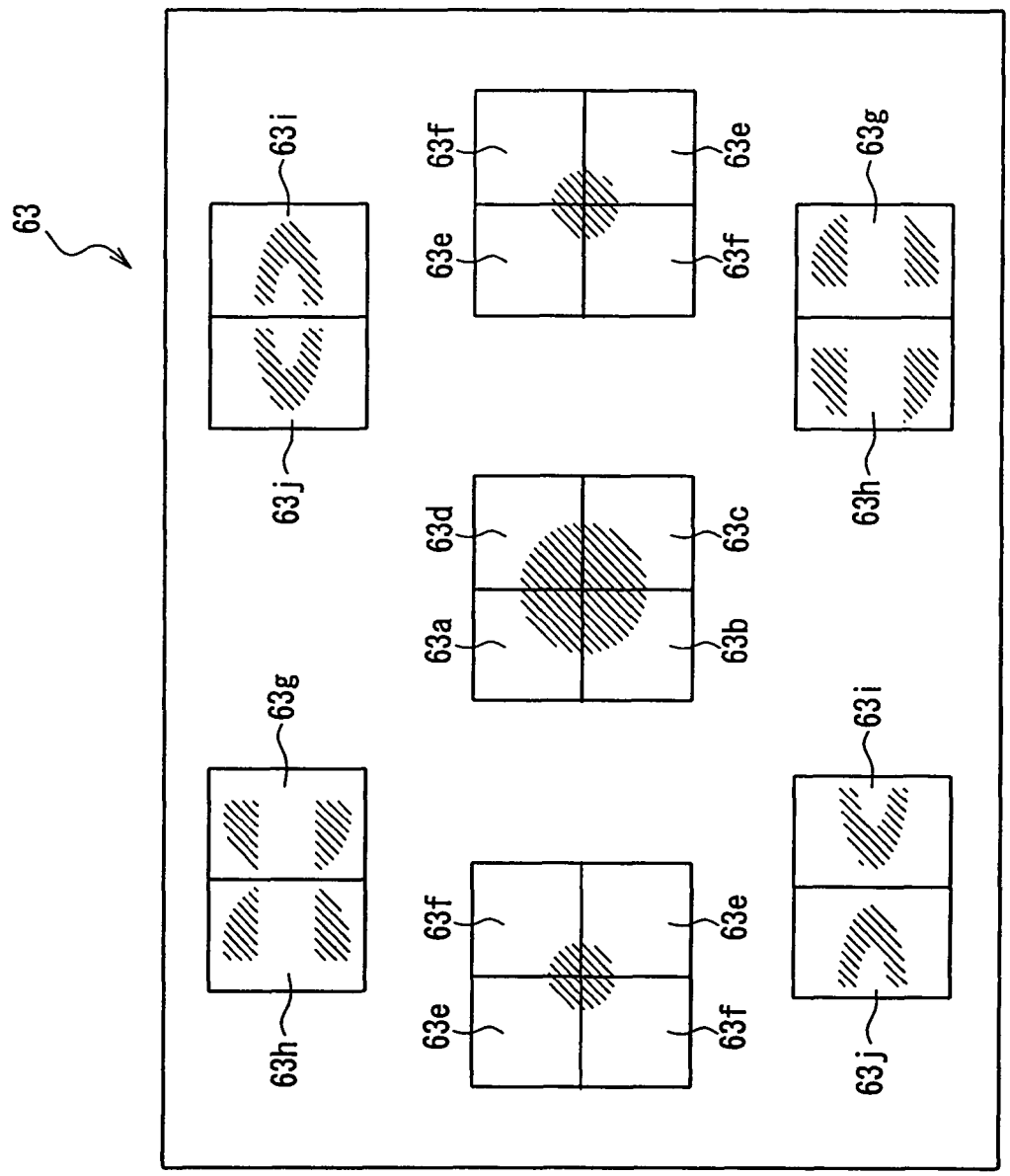
FIG. 15 is a diagram showing a pattern of a photodetector of the optical head according to Embodiment 3.

FIG. 15 shows a pattern of the photodetector 63 according to the present embodiment. The photodetector 63 is provided with a plurality of regions 63*a* to 63*j*.

Thus, ±1-order light that passes through the region 53*a* of the hologram 53 (regions on the outer side of the second and third splitting lines L8 and L9) is incident on the light receiving region 63*g* of the photodetector 63, ±1-order light that passes through the region 53*b* of the hologram 53 (regions on the outer side of the second and third splitting lines L8 and L9) is incident on the light receiving region 63*h* of the photodetector 63, ±1-order light that passes through the region 53*c* of the hologram 53 (one of the two regions between the second and third splitting lines L8 and L9) is incident on the light receiving region 63*i* of the photodetector 63 and ±1-order light that passes through the region 53*d* of the hologram 53 (the other of the two regions between the second and third splitting lines L8 and L9) is incident on the light receiving region 63*j* of the photodetector 63.

Furthermore, 0-order light, of which all light fluxes pass through, is focused on the regions 63*a* to 63*d* of the photodetector 63, divided into four. Furthermore, ±1-order light that passes through the region 53*e* of the hologram 53 (the region on the inner side of the fourth splitting line L10) is focused on the light receiving regions 63*e* and 63*f* of the photodetector 63, divided into four.

It should be noted that the anamorphic lens 73 is set with a refracting power of a lens such that when the focal point of the objective lens 5 is on the optical disk 6, the irradiated area of the light receiving regions 63*a* to 63*d* is equal, and is positionally adjusted. That is to say, it is adjusted such that the values of the electrical signals obtained from the light receiving regions 63*a* to 63*d* are equal. When set in this manner, the power of the output from the light receiving regions 63*a*, 63*c*, 63*b* and 63*d* of the photodetector 63 changes in accordance with the focal point shift of the objective lens 5. In a similar manner, the power of the output from the light receiving regions 63*e* and 63*f* of the photodetector 63 changes in accordance with the focal point shift of the objective lens 5.

The focus error signal FE is obtained by:

FE=signal obtained by the light receiving region 63*a*+ signal obtained by the light receiving region 63*c*−(signal obtained by the light receiving region 63*b*+signal obtained by the light receiving region 63*d*).

Furthermore, the push pull signal TE1 is obtained by:

TE1=signal obtained by the light receiving region 63*a*+signal obtained by the light receiving region 63*b*−(signal obtained by the light receiving region 63*c*+signal obtained by the light receiving region 63*d*).

Thus, although offset is generated in the push pull signal TE1 when the objective lens 5 moves in a direction perpendicular to the information tracks, by using a correction signal TE2 that does not include a push pull component, where TE2=signal obtained by the light receiving region 63*g*−signal obtained by the light receiving region 63*h*, it is possible to obtain a tracking error signal TE in which the offset caused by movement of the objective lens 5 is corrected.

TE=TE1−*k*1×TE2 where k1 is a correction coefficient. The correction coefficient k1 is determined such that movement of the objective lens 5 within a predetermined range does not generate an offset in the tracking error signal TE.

A method for detecting spherical aberration according to the present embodiment is described below.

Because the distance of the region 53*e* of the hologram 53 from the optical axis is small with respect to the entire light flux, the focal position when spherical aberration occurs differs from the amount of defocus of the entire light flux. Consequently, by comparing the focus error signal SAE1 obtained from the light flux that passed through the region 53*e* to the focus error signal SAE2 obtained from the entire light flux, it is possible to obtain a spherical aberration error signal SAE that expresses the size and direction of the spherical aberration that occurs.

SAE1=signal obtained by the light receiving region 63*e*−signal obtained by the light receiving region 63*f*, SAE2(=FE)=signal obtained by the light receiving region 63*a*+signal obtained by the light receiving region 63*c*−(signal obtained by the light receiving region 63*b*+signal obtained by the light receiving region 63*d*), and SAE=SAE2−*k*2×SAE1, where k2 is a correction coefficient. As was described in Embodiment 1, it is preferable that the correction coefficient k2 is set such that the slope of the focus error signal SAE1 when in a state in which there is no spherical aberration, and the slope of the focus error signal SAE2×k2 are substantially equal (the expression k2=SAE2/SAE1 is satisfied on a predetermined range×centered on the focal point).

It should be noted that depending on the size and direction of the spherical aberration that is detected, the spherical aberration corrector 11 adjusts the voltage applied to the liquid crystal element 20 to correct the spherical aberration. Furthermore, as described in Embodiment 1, it is possible to correct the spherical aberration by driving the collimator lens 4 in the direction of the optical axis of the laser light.

Next, the method for detecting tilt, which is the relative inclination between the objective lens 5 and the optical disk 6, is described. The effect of phase shift due to tilt appears mainly in regions centered around the optical axis, and it is possible to determine the amount of tilt that is generated by comparing the push pull signal of the entire light flux to the push pull signal of the region in the center of the light flux.

The push pull signal of the region in the center of the light flux is TE1, and this is expressed by:

TE1=signal obtained by the light receiving region 63g–signal obtained by the light receiving region 63h.

On the other hand, the push pull signal TE0 of the entire light flux is detected by the regions 63a to 63d on which 0-order light is focused, and is expressed by:

TE0=signal obtained by the light receiving region 63a+signal obtained by the light receiving region 63b–(signal obtained by the light receiving region 63c+signal obtained by the light receiving region 63d).

The phase difference between the push pull signal TE1 and the push pull signal TE0 is the amount of tilt that is generated.

It should be noted that since offset is generated in the push pull signal TE1 and the push pull signal TE0 in accordance with movement of the objective lens 5, for detecting tilt, it is preferable that these are corrected by using correction signals TE2 that do not include a push pull component, that is to say:

TE=TE1–k1×TE2, and

TE'=TE0–k3×TE2, (where k1 and k3 are correction coefficients).

It should be noted that depending on the size and direction of the tilt that is detected, the control circuit 11 can adjust the current driving the objective lens 5 to correct the relative inclination between the objective lens 5 and the optical disk 6.

Figure 16:
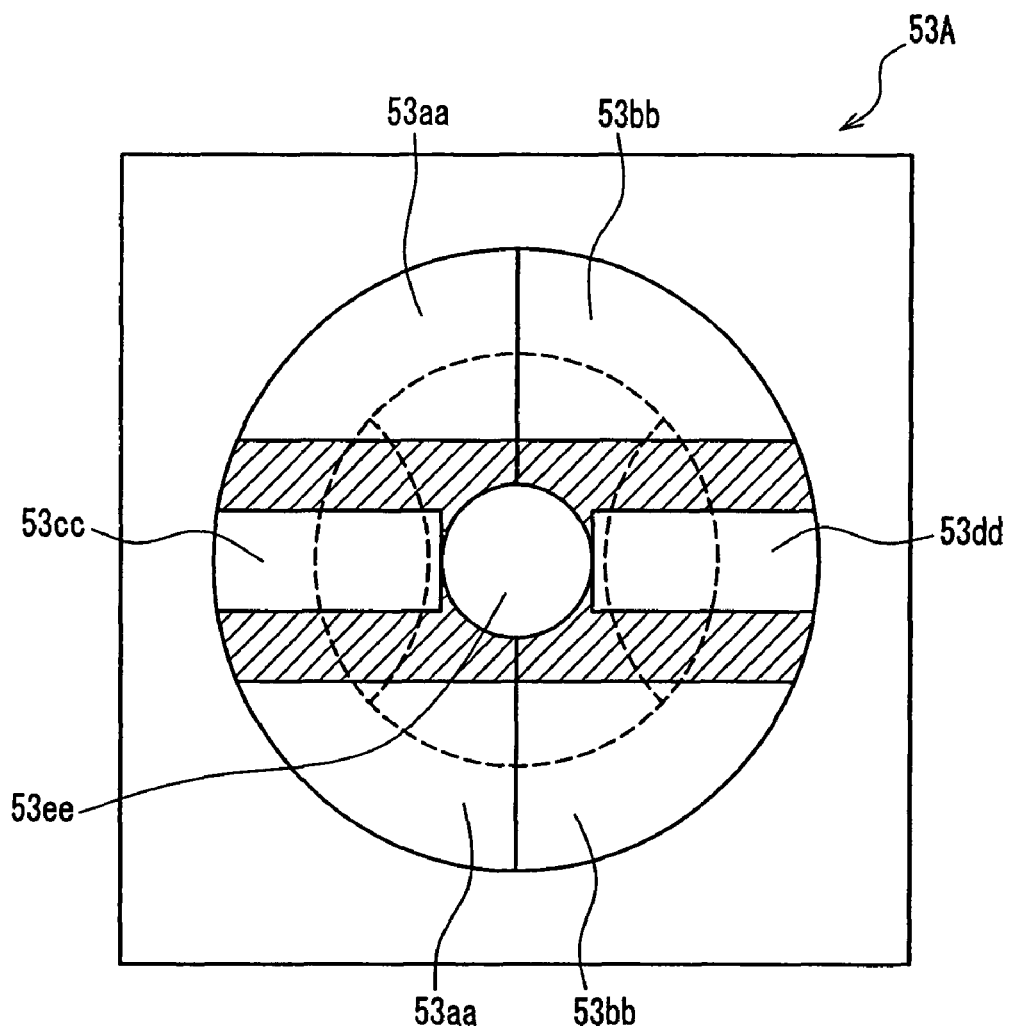
FIG. 16 is a diagram showing a pattern of another hologram of the optical head according to Embodiment 3.

Here, FIG. 16 shows a pattern of another hologram 53A according to the present embodiment. The hologram 53A shown in FIG. 16 is divided into seven regions, from a region 53aa to a region 53ee. The I-shaped region shown by hatching in the diagram is not used for signal detection.

It is obvious that the pattern of hologram 53A shown in FIG. 16 is able to detect spherical aberration and tilt in a similar manner to the pattern of the hologram 53 shown in FIG. 14.

Depending on the pitch of the information tracks on the optical disk 6, the thickness of the substrate and the wavelength of the semiconductor laser 1, by using the pattern of the hologram 53A shown in FIG. 16 there are effects such as being able to reduce the offset of the tracking error signals due to focal point shift and tilt, and advantages such as being able to use the region 53ee, which is not necessary for tracking error signal detection, to detect spherical aberration.

Embodiment 4

Figure 17:
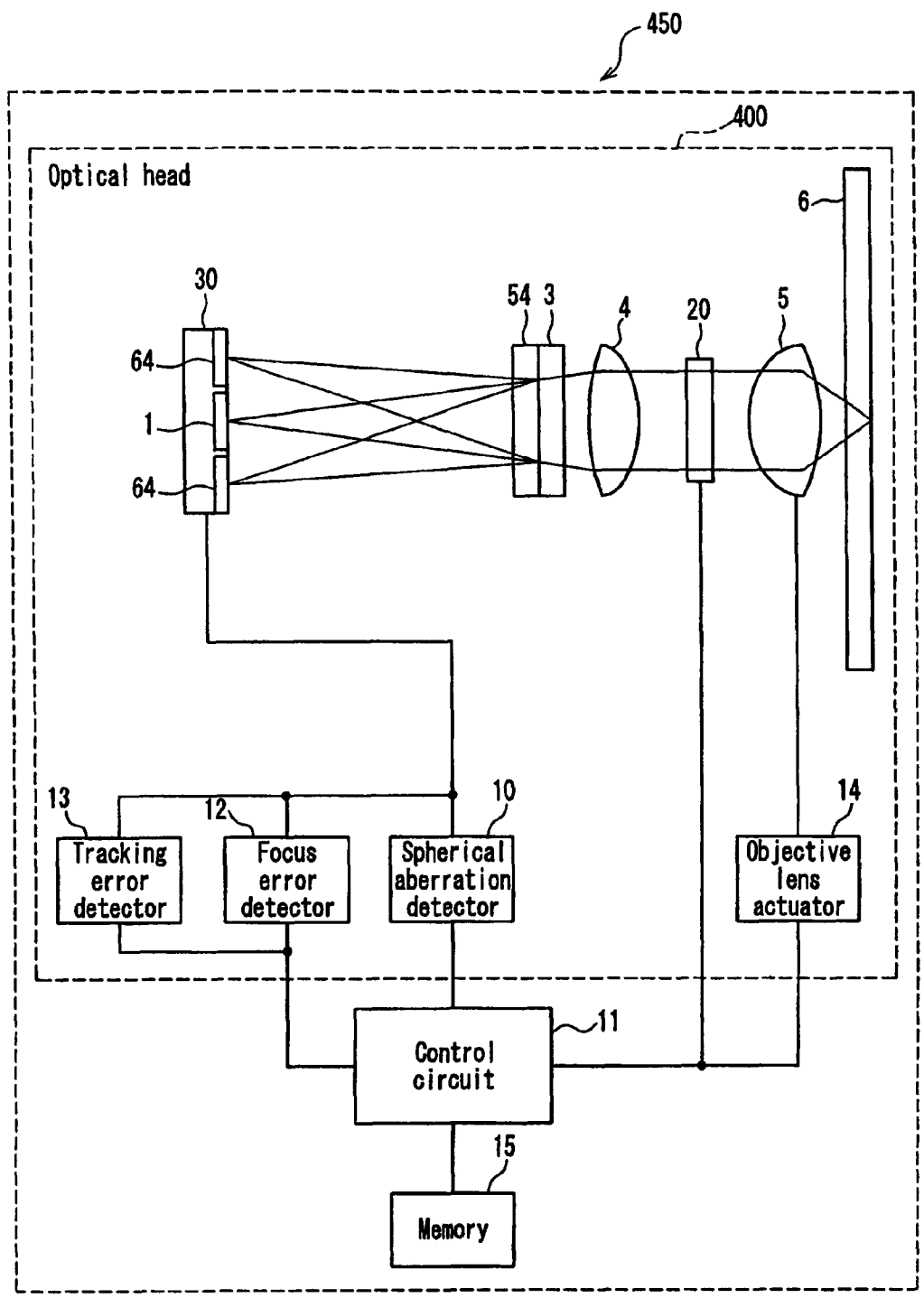
FIG. 17 is a structural overview of an optical head according to Embodiment 4.

FIG. 17 shows a structural overview of an optical disk device 450 according to another embodiment of the present invention. The optical disk device 450 includes an optical head 400, a control circuit 11 and a memory 15.

In the optical head 400 shown in FIG. 17, numeral 30 denotes an integrated light receiving/emitting element that integrally combines a semiconductor laser 1 that corresponds to a light source, and photodetectors 64 that correspond to light receiving elements, numeral 3 denotes a ¼ wavelength plate, numeral 4 denotes a collimator lens, numeral 5 denotes an objective lens that corresponds to a focusing optical system, numeral 6 denotes an optical disk, numeral 54 denotes a polarizing hologram that corresponds to light splitting means, numeral 10 denotes a spherical aberration detector, numeral 12 denotes a focus error detector, numeral 13 denotes a tracking error detector, numeral 14 denotes an objective lens actuator and numeral 20 denotes a liquid crystal element that corresponds to spherical aberration correction means.

Linearly polarized laser light that is emitted from the semiconductor laser 1 in the integrated light receiving/emitting element 30 passes through the polarizing hologram 54 without being diffracted, is converted to circularly polarized light by the ¼ wavelength plate 3, is converted to substantially parallel light by the collimator lens 4, passes through the liquid crystal element 20, and is passed through the substrate of the optical disk 6 to focus on the recording and reproduction information surface by the objective lens 5.

The laser light reflected by the recording and reproduction information surface of the optical disk 6 passes again through the substrate, passes through the objective lens 5, the liquid crystal element 20 and the collimator lens 4, is converted by the ¼ wavelength plate 3 to linearly polarized light that is polarized in a direction perpendicular to the linearly polarized light of the forward light path, after which the laser light is spatially divided into a plurality of light fluxes by diffraction by the polarizing hologram 54, and is guided to the photodetectors 64.

The photodetectors 64 are divided into a plurality of light receiving regions, and the light is converted to signals depending on the quantity of light incident on the respective light receiving regions, which are transmitted to the spherical aberration detector 10, the focus error detector 12 and the tracking error detector 13, to detect the information signal and the error signal.

Thus, the polarizing hologram 54 is configured such that without diffracting linearly polarized light on the forward light path, it diffracts substantially all the linearly polarized light on the return light path as ±1-order light.

Figure 18:
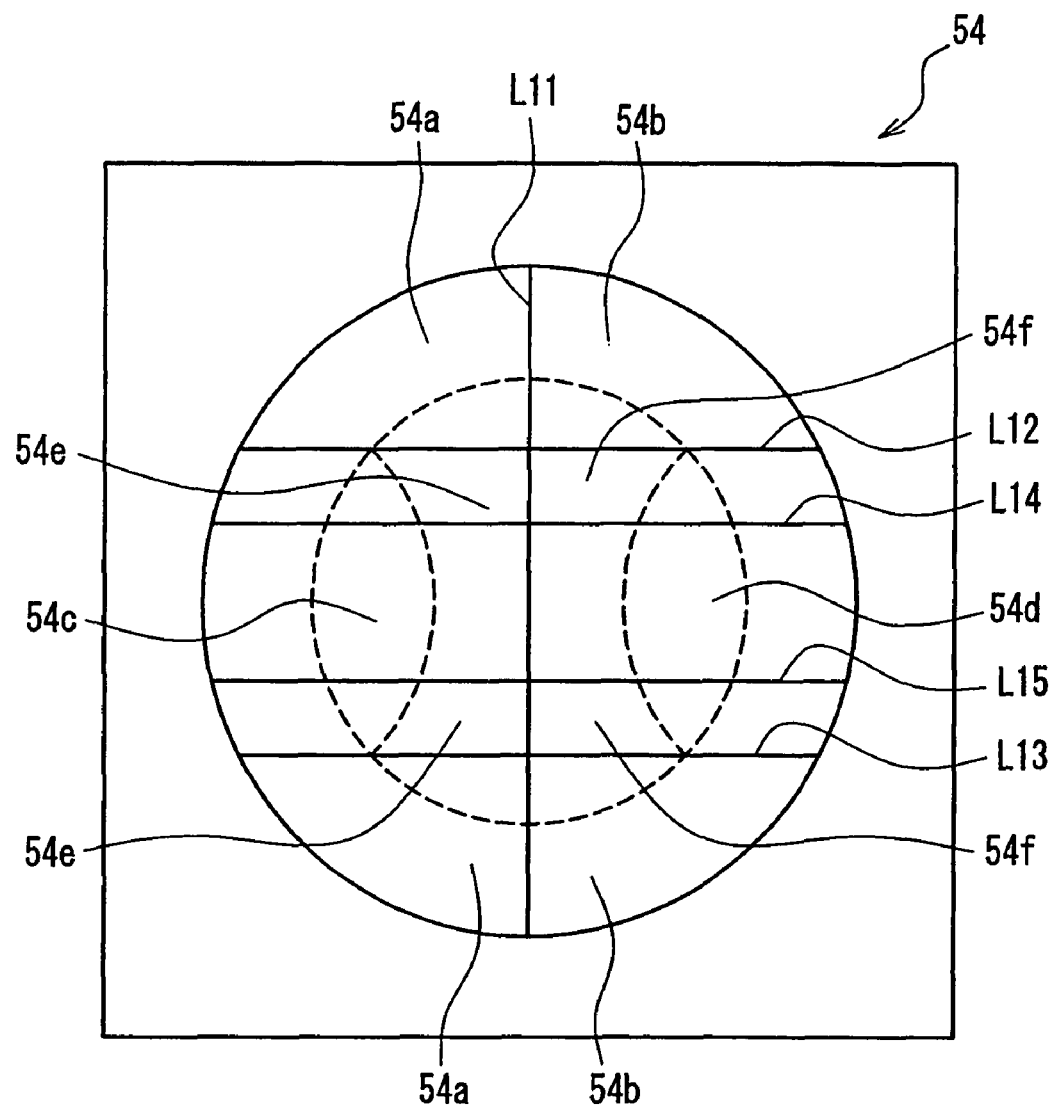
FIG. 18 is a diagram showing a pattern of a polarizing hologram of the optical head according to Embodiment 4.

FIG. 18 shows an example of a pattern of the polarizing hologram 54 according to the present embodiment.

As shown in FIG. 18, the polarizing hologram 54 is divided into ten regions by a first splitting line L11 that is substantially parallel to the direction of the information tracks on the optical disk 6 (border of a region 54a and a region 54b, of a region 54c and a region 54d, and of a region 54e and a region 54f), second and third splitting lines L12 and L13 that are substantially perpendicular to the first splitting line and are substantially symmetrical about the optical axis of the objective lens 5 (border of the region 54a and the region 54e, and of the region 54b and the region 54f) and fourth and fifth splitting lines L14 and L15 that are substantially parallel to the second and third splitting lines and are substantially symmetrical about the optical axis of the objective lens 5 (border of the region 54c and the region 54e, and the region 54d and of the region 54f).

Figure 19:
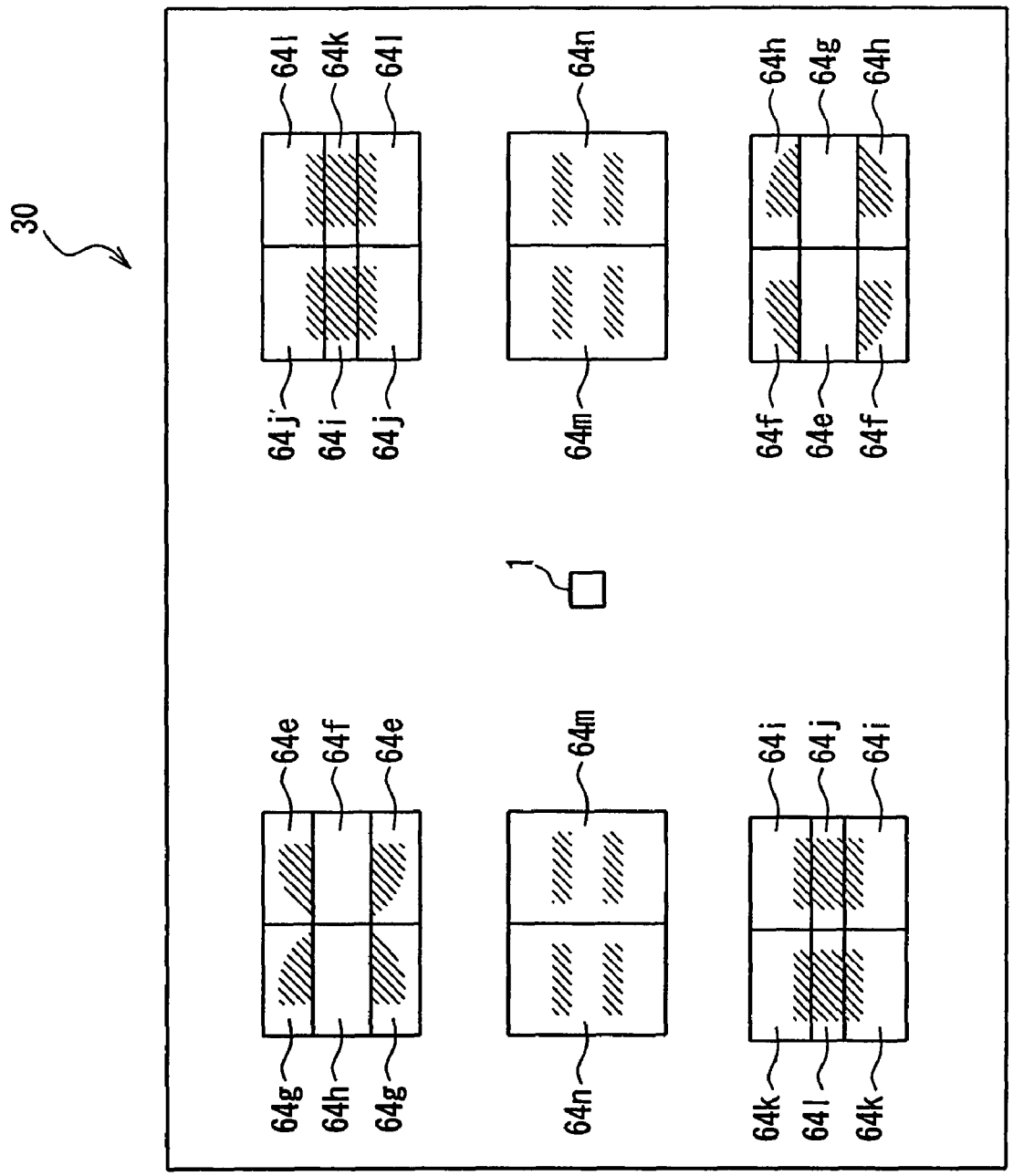
FIG. 19 is a diagram showing a pattern of an integrated light receiving/emitting element of the optical head according to Embodiment 4.
Figure 20:
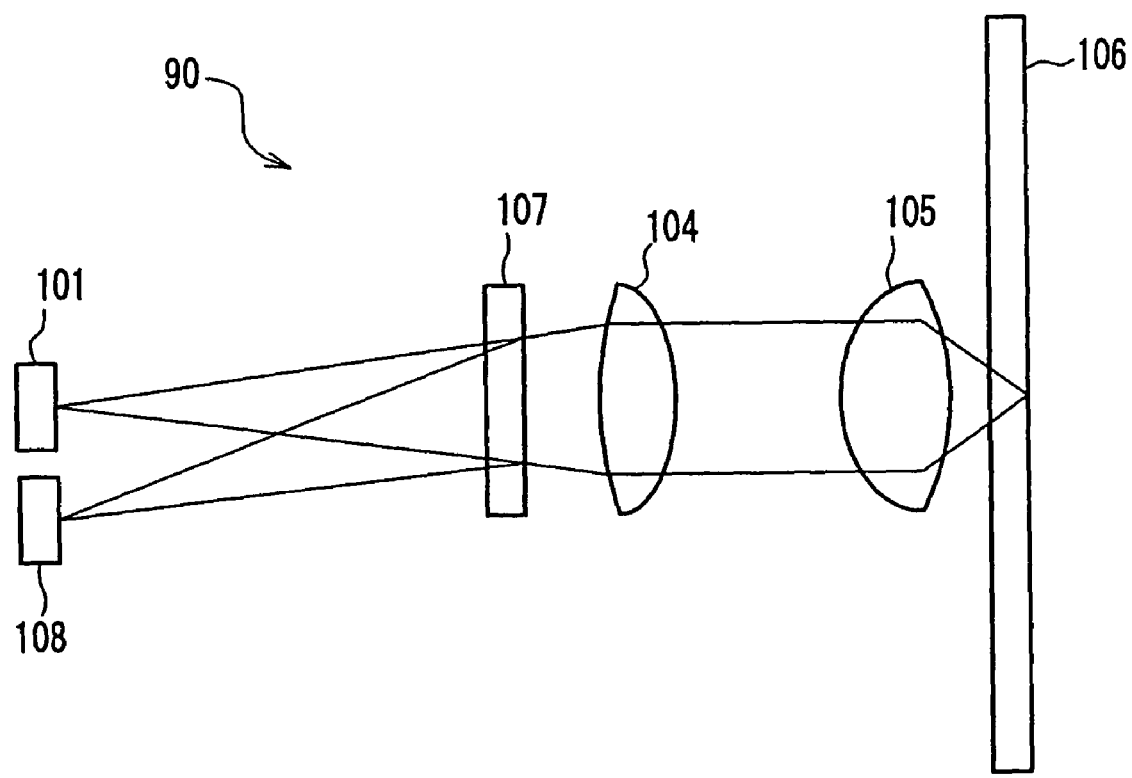
FIG. 20 is a structural overview of a conventional optical head that is capable of detecting spherical aberration.
Figure 21:
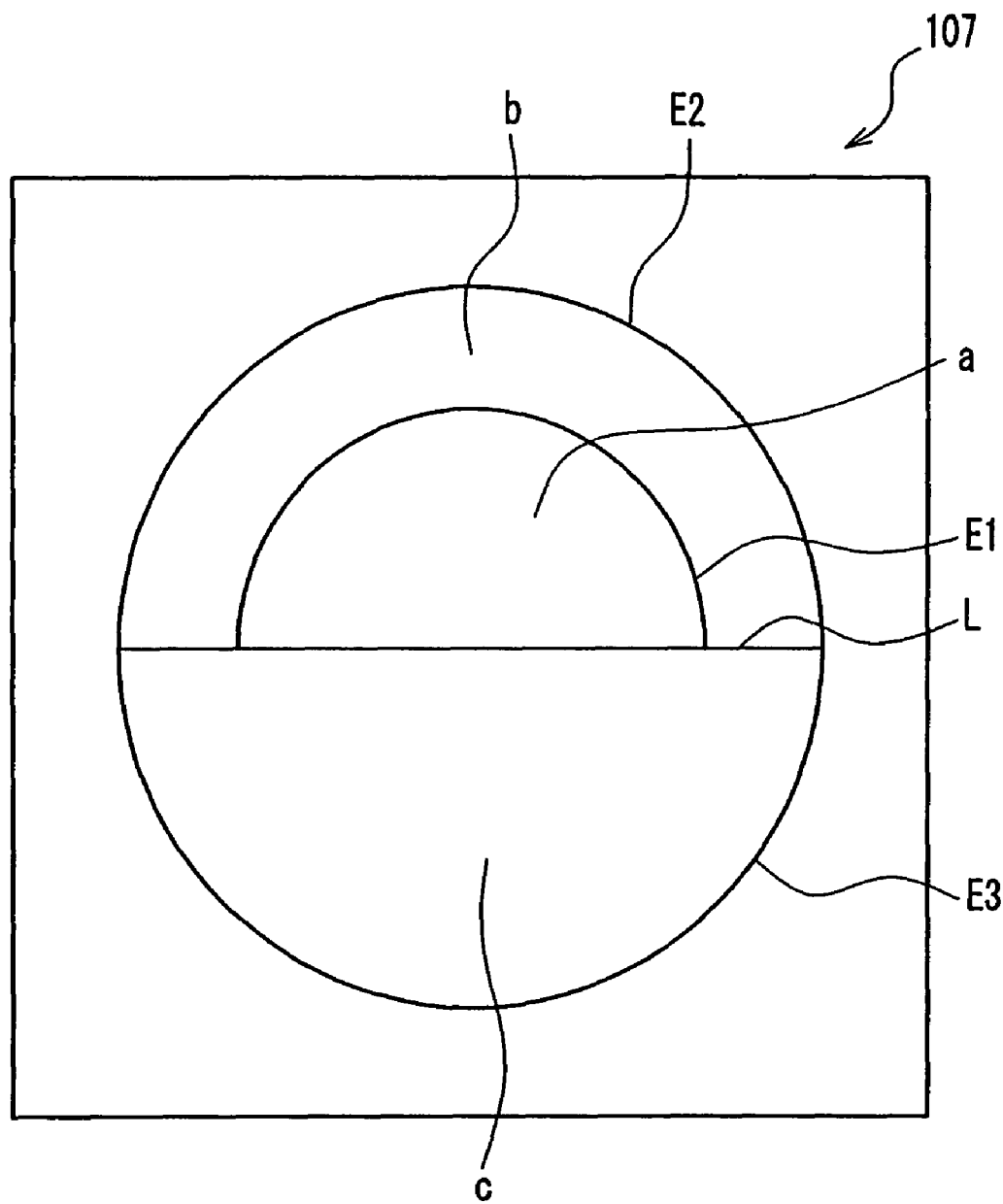
FIG. 21 is a diagram of a pattern of a hologram of a conventional optical head that is capable of detecting spherical aberration.
Figure 22:
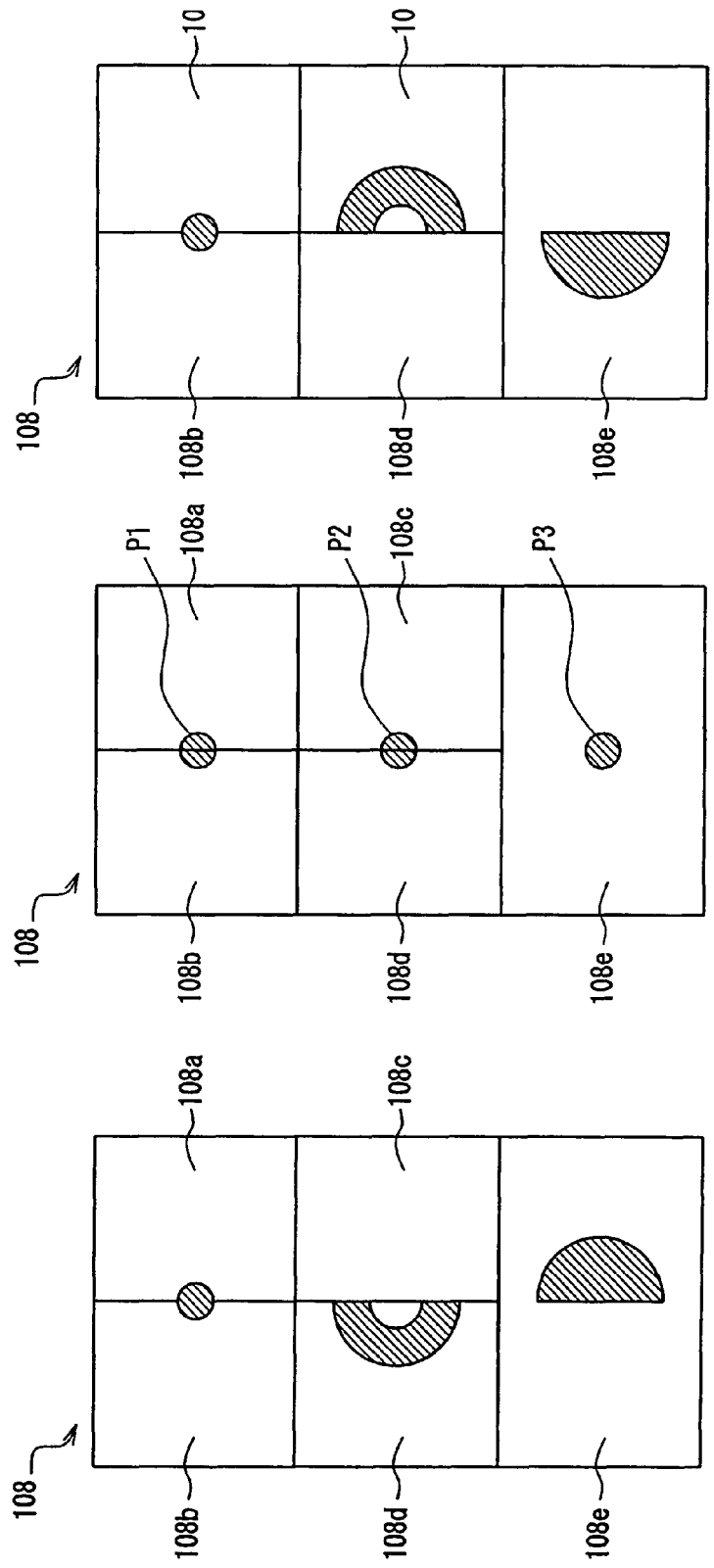
FIG. 22A to FIG. 22C are diagrams showing patterns of a photodetector of a conventional optical head that is capable of detecting spherical aberration.
Figure 23:
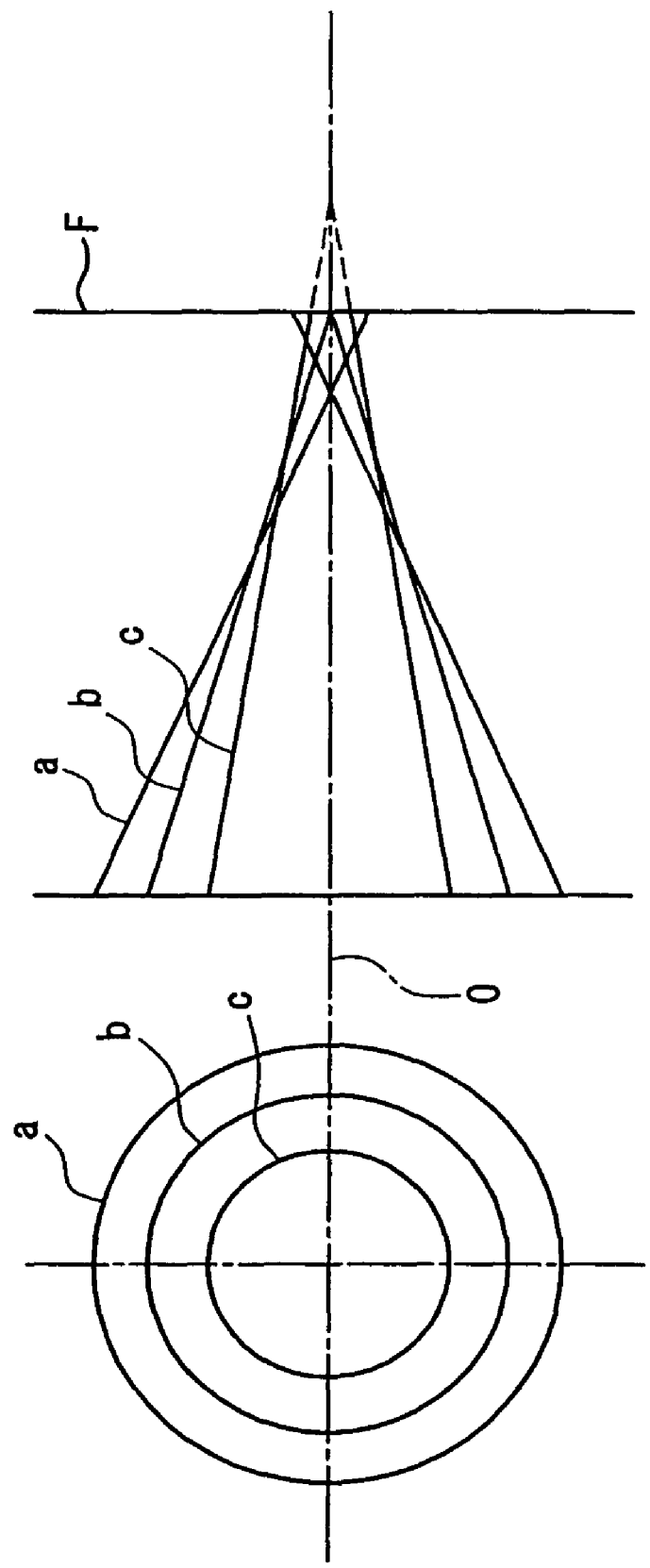
FIG. 23 is a diagram schematically showing the state of the light rays when spherical aberration occurs.
Figure 24:
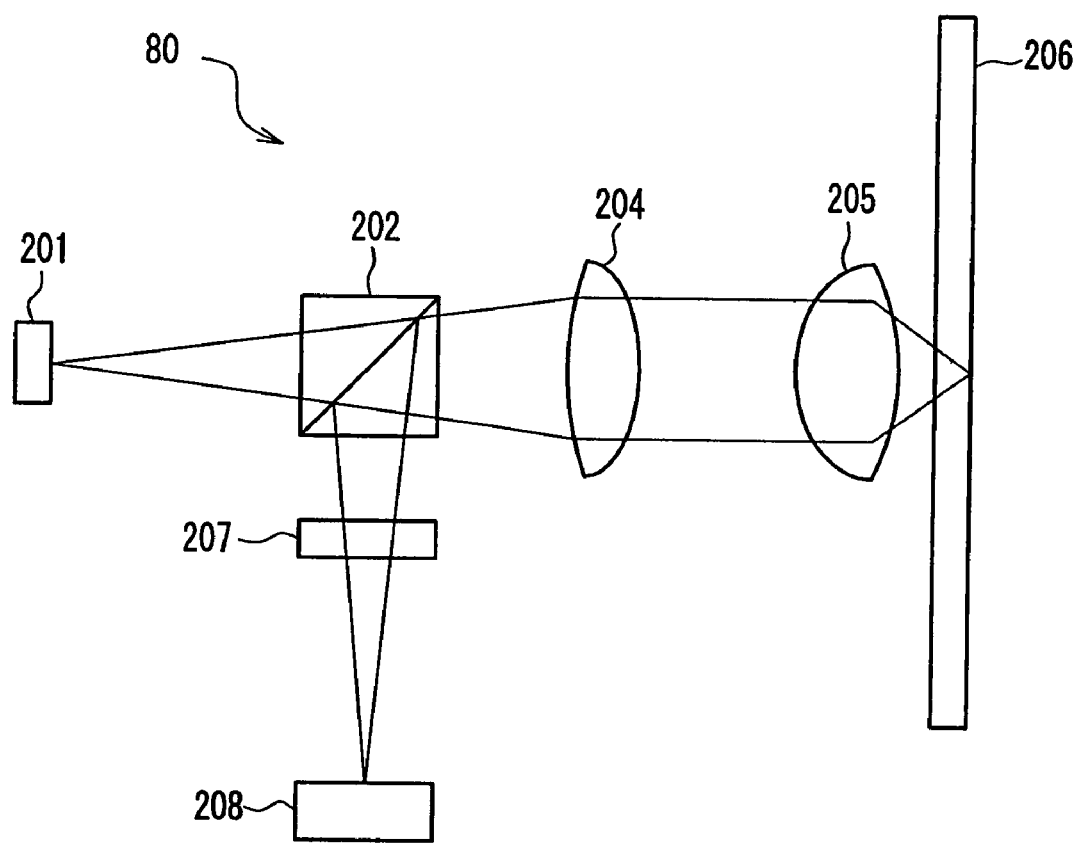
FIG. 24 is a structural overview of a conventional optical head that is capable of detecting tilt.
Figure 25B:
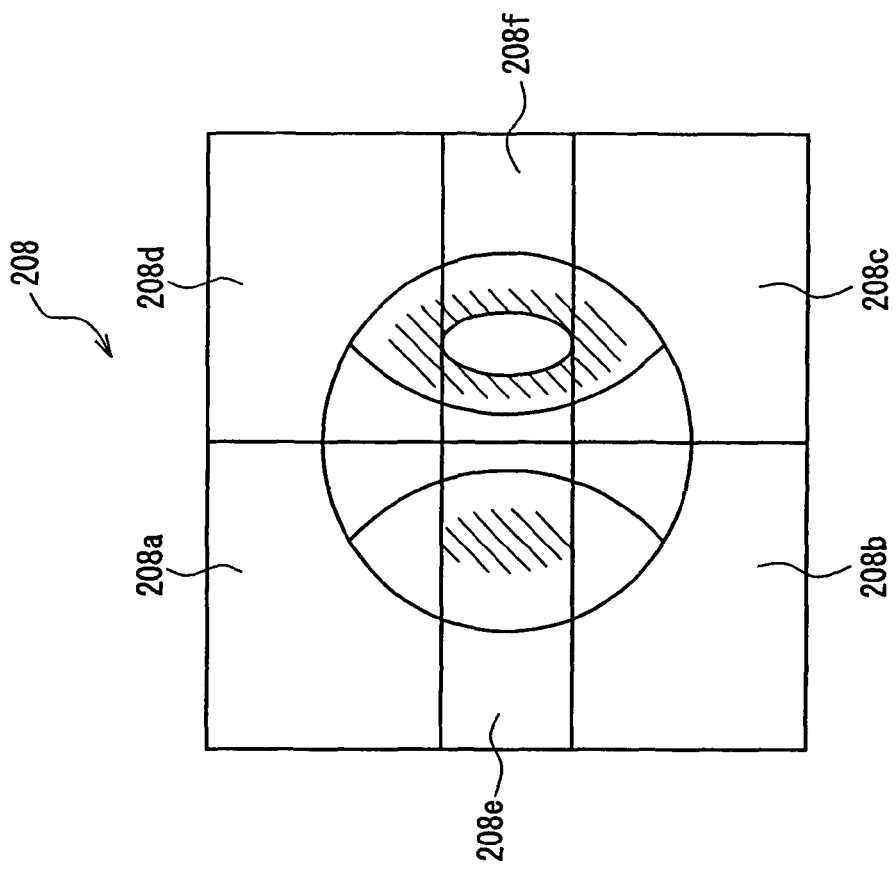
FIG. 25A and FIG. 25B are diagrams showing a pattern of a photodetector of a conventional optical head that is capable of detecting tilt.
Figure 25A:
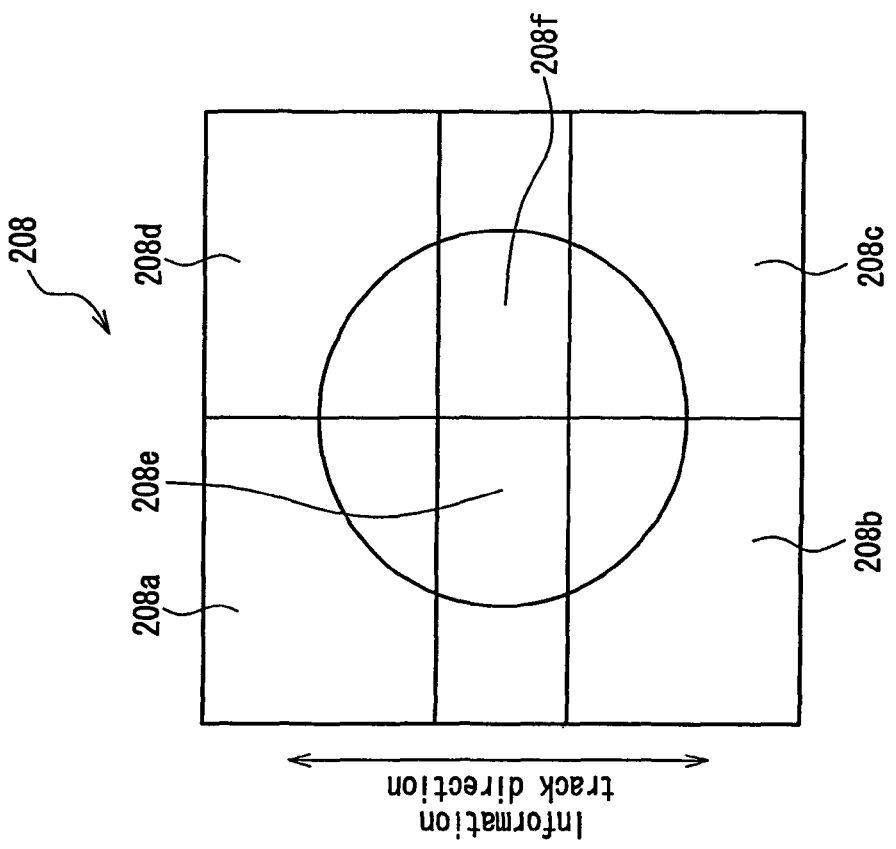

FIG. 19 shows a pattern of the light receiving region of the integrated light receiving/emitting element 30 according to the present embodiment. The integrated light receiving/emitting element 30 is provided with a plurality of light receiving regions 64e to 64n. It should be noted that the center of the integrated light receiving/emitting element 30 is the semiconductor laser 1.

Thus, ±1-order light that passes through the region 54a of the hologram 54 (regions on the outer side of the second and third splitting lines L12 and L13) is incident on the light receiving region 64e and the light receiving region 64f of the photodetector 64, ±1-order light that passes through the region 54b of the hologram 54 (regions on the outer side of the second and third splitting lines L12 and L13) is incident on the light receiving region 64g and the light receiving region 64h of the photodetector 64, ±1-order light that passes through the region 54c of the hologram 54 (one of the two regions between the fourth and fifth splitting lines L14 and L15) is incident on the light receiving region 64i and the light receiving region 64j of the photodetector 64, and ±1-order light that passes through the region 54d of the hologram 64 (one of the two regions between the fourth and fifth splitting lines L14 and L15) is incident on the light receiving region 64k and the light receiving region 64l of the photodetector 64.

±1-order light that passes through the region 54e of the hologram 54 (one of the regions between the second and third splitting lines L12 and L13, and on the outer side of the fourth and fifth splitting lines L14 and L15) is incident on the light receiving region 64m of the photodetector 64, and ±1-order light that passes through the region 54f of the hologram 54 (one of the regions between the second and third splitting lines L12 and L13, and on the outer side of the fourth and fifth splitting lines L14 and L15) is incident on the light receiving region 64n of the photodetector 64.

It should be noted that +1-order light at the regions 54a to 54d of the hologram 54 has a focal point that is further than the light receiving surface of the photodetector 64, the −1-order light at the regions 54a to 54d of the hologram 54 has a focal point that is closer than the light receiving surface of the photodetector 64, and also the grating pattern of the polarizing hologram 54 is given the refracting power of a lens such that when the optical disk 6 is at the focal point of the objective lens 5, the size of the light fluxes of the ±1-order light on the light receiving surface of the photodetector 64 is substantially the same. By setting the polarizing hologram 54 in such a manner, the sizes of the light fluxes of the ±1-order light on the light receiving surface of the photodetector 64 change in accordance with the focal point shift of the objective lens 5.

The focus error signal FE is obtained by:

FE=signal obtained by the light receiving region 64e+
signal obtained by the light receiving region 64g+signal obtained by the light receiving region 64i+signal obtained by the light receiving region 64k−(signal obtained by the light receiving region 64f+signal obtained by the light receiving region 64h+signal obtained by the light receiving region 64j+signal obtained by the light receiving region 64l).

Furthermore, the push pull signal TE1 is obtained by:

TE1=signal obtained by the light receiving region 64i+signal obtained by the light receiving region 64j−(signal obtained by the light receiving region 64k+signal obtained by the light receiving region 64l).

Thus, although offset is generated in the push pull signal TE1 when the objective lens 5 moves in a direction perpendicular to the information tracks, by using a correction signal TE2 that does not include a push pull component, that is to say:

TE2=signal obtained by the light receiving region 64e+signal obtained by the light receiving region 64f−(signal obtained by the light receiving region 64g+signal obtained by the light receiving region 64h), it is possible to obtain a tracking error signal TE in which the offset created by movement of the objective lens 5 is corrected.

TE=TE1−$k1$×TE2 where k1 is a correction coefficient. The correction coefficient k1 is determined such that movement of the objective lens 5 within a predetermined range does not generate an offset in the tracking error signal TE.

A method for detecting spherical aberration according to the present embodiment is described below.

The regions 54a and 54b, and the regions 54c and 54d of the polarizing hologram 54 are different distances from the optical axis to each other, and thus their focal positions differ when spherical aberration occurs. Consequently, by comparing the focus error signal SAE1 obtained from light fluxes passing through the regions 54a and 54b of the hologram 54 to the focus error signal SAE2 obtained from light fluxes passing through the regions 54c and 54d, it is possible to obtain a spherical aberration error signal SAE that expresses the size and direction of the spherical aberration that occurs.

SAE1=signal obtained by the light receiving region 64e+signal obtained by the light receiving region 64g−(signal obtained by the light receiving region 64f+signal obtained by the light receiving region 64h), SAE2=signal obtained by the light receiving region 64i+signal obtained by the light receiving region 64k−(signal obtained by the light receiving region 64j+signal obtained by the light receiving region 64l), and SAE=SAE2−$k2$×SAE1, where k2 is a correction coefficient. As was described in Embodiment 1, it is preferable that the correction coefficient k2 is set such that the slope of the focus error signal SAE1 when in a state in which there is no spherical aberration, and the slope of the focus error signal SAE2×k2 are substantially equal (the expression k2=SAE2/SAE1 is satisfied on a predetermined range×centered on the focal point).

It should be noted that depending on the size and direction of the spherical aberration that is detected, the spherical aberration corrector 11 adjusts the voltage applied to the liquid crystal element 20 to correct the spherical aberration. Furthermore, as described in Embodiment 1, it is possible to correct the spherical aberration by driving the collimator lens 4 in the direction of the optical axis of the laser light.

Next, a method for detecting tilt, which is the relative inclination between the objective lens 5 and the optical disk 6, is described. Because the effect of phase shift due to tilt appears mainly in regions centered around the optical axis, it is possible to determine the amount of tilt that is generated by comparing the two push pull signals, which are mutually different distances from the optical axis.

The push pull signal close to the optical axis is the TE1, and this is expressed by:

TE1=signal obtained by the light receiving region 64i+signal obtained by the light receiving region 64j−(signal obtained by the light receiving region 64k+signal obtained by the light receiving region 64l).

On the other hand, the push pull signal TE0 that is far from the optical axis is expressed by:

TE0=signal obtained by the light receiving region 64m−signal obtained by the light receiving region 64n.

The phase difference between the push pull signal TE1 and the push pull signal TE0 is the amount of tilt that is generated.

It should be noted that depending on the size and direction of the tilt that is detected, the spherical aberration corrector 11 can adjust the current driving the objective lens 5 to correct the relative inclination between the objective lens 5 and the optical disk 6.

Although the configuration of the optical head using the integrated light receiving/emitting element and the polarizing hologram described in the present embodiment detects signals in a similar manner to that based on SSD focus detection (Embodiment 1), an optical head using such an integrated light receiving/emitting element and a polarizing hologram is not limited to the patterns of the polarizing hologram and light receiving regions according to the present invention. Even if it is configured according to a signal detection method similar to one based on knife edge focus detection (Embodiment 2) or based on astigmatic focus detection (Embodiment 3), for example, the configuration of the optics in the forward and return light paths is simple, and an optical head that has cost and size advantages may be obtained.

Moreover, by integrally configuring the optical system that includes the integrated light receiving/emitting element 30, the polarizing hologram 54 and the ¼ wavelength plate 3 in FIG. 17 as an integrated optical element, the optical head enjoys further cost and size advantages and is thus more preferable.

On the other hand, the method for correcting tilt is not limited to the method described in the present embodiment in which the relative inclination between the objective lens and the optical disk is corrected by driving the objective lens, and it is clear that various correction methods, such as activating a liquid crystal element that is capable of phase control to cancel out only coma aberration that is generated, also may be applied.

INDUSTRIAL APPLICABILITY

With the optical head of the present invention, it is possible to obtain the superior effect of adding a spherical aberration detection function to an optical head that is provided with tracking error signal detection capable of correcting offset when the objective lens moves, and with what is known as SSD focus detection that detects the amount of focus shift from the size of a light spot, without greatly changing the configuration of the optical head.

Furthermore, with the optical head of the present invention, it is possible to obtain the superior effect of adding a spherical aberration detection function and a tilt detection function to an optical head that is provided with tracking error signal detection capable of correcting offset when the objective lens moves, and with what is known as SSD focus detection that detects the amount of focus shift from the size of a light spot, without greatly changing the configuration of the optical head.

With the optical head of the present invention, it is also possible to obtain the superior effect of adding a spherical aberration detection function to an optical head that is provided with tracking error signal detection capable of correcting offset when the objective lens moves, and with what is known as knife edge focus detection that detects the amount of focal point shift by comparing the quantity of light detected in light receiving regions that are divided into two, without greatly changing the configuration of the optical head.

With the optical head of the present invention, it is also possible to obtain the superior effect of adding a spherical aberration detection function and a tilt detection function to an optical head that is provided with tracking error signal detection capable of correcting offset when the objective lens moves, and with what is known as knife edge focus detection that detects the amount of focal point shift by comparing the quantity of light detected in light receiving regions that are divided into two, without greatly changing the configuration of the optical head.

With the optical head of the present invention, it is also possible to obtain the superior effect of adding a spherical aberration detection function to an optical head that is provided with tracking error signal detection capable of correcting offset when the objective lens moves, and with what is known as astigmatic focus detection that detects the amount of focal point shift from changes in the shape of a light spot to which astigmatism is applied, on a light receiving element, without greatly changing the configuration of the optical head.

With the optical head of the present invention, it is also possible to obtain the superior effect of adding a spherical aberration detection function and a tilt detection function to an optical head that is provided with tracking error signal detection capable of correcting offset when the objective lens moves, and with what is known as astigmatic focus detection that detects the amount of focal point shift from changes in the shape of a light spot to which astigmatism is applied, on a light receiving element, without greatly changing the configuration of the optical head.

Moreover, with the optical head of the present invention, in the state in which spherical aberration does not occur, since the spherical aberration correction signal is substantially zero even when focal point shift occurs, the spherical aberration correction signal SAE is not affected by the focal point shift. Thus, it is possible to increase the accuracy of spherical aberration correction.

With the optical head of the present invention, it is also possible to obtain the superior effect of greatly increasing the utilization efficiency of the laser light that is incident on the optical disk by configuring the optical head such that linearly polarized light emitted from the light source that is incident on the polarizing hologram is not diffracted, and that linearly polarized light of the return light path, which is reflected by the optical disk and is incident on the polarizing hologram, substantially is diffracted as ±1-order light.

With the optical head of the present invention, it is also possible to obtain the superior effects of not just simplifying adjustment by disposing the light source and the light receiving element in about the same plane, but also advantages of miniaturization of the optical head as well as cost.

With the optical head of the present invention, it is also possible to obtain the superior effects of not just simplifying adjustment by disposing the light source and the light receiving element in about the same plane as well as integrally configuring the light splitting means whose position is set, but also advantages of miniaturization of the optical head as well as cost.

With the optical head of the present invention, which is provided with spherical aberration correction means for correcting spherical aberration generated by the focusing optical system, it is also possible to obtain the superior effects of obtaining an optical head that is small, and that is capable of detecting and correcting spherical aberration, without the need to substantially change the configuration of a conventional optical head, because the spherical aberration correction means corrects the spherical aberration by changing the phase of wavefronts that pass through a liquid crystal element due to the application of a voltage in accordance with the spherical aberration error signal and driving mechanisms such as actuators are not used.

With the optical head of the present invention, which is provided with a collimator lens that converts laser light emitted from the light source to substantially parallel light, it is also possible to obtain the superior effect of obtaining an optical head that is capable of detecting and correcting spherical aberration, by just driving the collimator lens of a conventional optical head, without substantially changing the optical configuration and also without reducing the light utilization efficiency of the laser light, because the spherical aberration generated by the focusing optical system is corrected by displacing the collimator lens in the direction of the optical axis of the focusing optical system in accordance with the spherical aberration error signal.

The invention claimed is:

1. An optical head, comprising:

a light source for radiating laser light an objective lens for focusing the laser light that is radiated from the light source onto an information recording medium;

light splitting device for spatially dividing the laser light that is reflected by the information recording medium and that passes through the objective lens into a plurality of light fluxes;

a light receiving element for receiving the plurality of light fluxes divided by the light splitting device;

tracking error signal detection part for detecting a tracking error signal based on the plurality of light fluxes received by the light receiving element; and spherical aberration detection part for detecting spherical aberration that occurs between the radiation of the laser light from the light source and the focusing of the laser light onto the information recording medium, based on the plurality of light fluxes received by the light receiving element;

wherein the light splitting device has seven regions that are divided by first and second splitting lines arranged in parallel that are substantially perpendicular to the longitudinal direction of the information track formed on the information recording medium and are substantially symmetrical about the optical axis of the objective lens, a third splitting line that is circular, positioned between the first and second splitting lines and centered on the optical axis of the objective lens, a fourth splitting line that is substantially perpendicular to the first splitting line, the fourth splitting line taking a first point on the third splitting line as a starting point, and a fifth splitting line that is substantially perpendicular to the second splitting line, the fifth splitting line taking a second point on the third splitting line as a starting point;

wherein the tracking error signal detection part generates a first push pull signal by calculating signals detected by receiving light fluxes created by laser light passing through those two of the seven regions that are disposed on the outer side of the third splitting line and between the first and second splitting lines, and generates a signal for correcting the offset of the first push pull signal caused by movement of the objective lens, by calculating signals detected by receiving light fluxes created by laser light passing through four regions, of the seven regions, that are disposed on the outer side of the first and second splitting lines; and wherein the spherical aberration detection part compares a first focal point shift amount obtained by detecting changes in the shape of a light spot that is focused on the light receiving element by applying an astigmatism to light fluxes created by laser light passing through a region on the inner side of the third splitting line, and a second focal point shift amount obtained by detecting changes in the shape of a light spot that is focused on the light receiving element by applying an astigmatism to light fluxes created by laser light passing through the entire region of the light splitting device, to generate a spherical aberration error signal for detecting the spherical aberration generated between the radiation of the laser light from the light source and the focusing of the laser light onto the information recording medium.

2. The optical head according to claim 1, further comprising tilt detection part for detecting the relative inclination between the objective lens and the information recording medium, wherein the interval between the first and second splitting lines is narrower than the width, in the longitudinal direction of the information track of the information recording medium, of the region in which 0-order light and ±1-order light that are diffracted at the information track of the information recording medium are superimposed; and wherein the tilt detection part compares the phase of a first push pull signal obtained by calculating signals detected by receiving light fluxes created by laser light passing through two regions that are disposed on the outer side of the third splitting line and between the first and second splitting lines, and of a second push pull signal obtained by calculating signals detected by receiving light fluxes created by laser light passing through the entire region of the light splitting device, to generate a tilt error signal for detecting the relative inclination between the objective lens and the information recording medium.

3. The optical head according to claim 1, wherein the light splitting device divides the laser light that passes through the region on the inner side of the third splitting line into at least 0-order light and a first plurality of ±1-order diffracted light, divides the laser light that passes through the two regions that are disposed on the outer side of the third splitting line and between the first and second splitting lines into at least 0-order light and a second plurality of ±1-order diffracted light, and divides the laser light that passes through the four regions that are disposed on the outer side of the first and second splitting lines into at least 0-order light and a third plurality of ±1-order diffracted light;

wherein the light receiving element has a first plurality of light receiving regions, divided into four, that divides the first plurality of ±1-order diffracted light into four and receives that light, a second plurality of light receiving regions that receive each of the second plurality of ±1-order diffracted light, a third plurality of light receiving regions that receive each of the third plurality of ±1-order diffracted light, and a fourth light receiving regions, divided into four, that divides 0-order light into four and receives that light;

wherein the first focal point shift amount is obtained based on a plurality of signals detected by the first plurality of light receiving regions, divided into four; and wherein the second focal point shift amount is obtained based on a plurality of signals detected by the fourth light receiving regions, divided into four.

4. The optical head according to claim 1, wherein the signal indicating the first focal point shift amount is SAE2, and the signal indicating the second focal point shift amount is SAE1, and the spherical aberration correction signal SAE is expressed by:

$$SAE=SAE2-k\times SAE1,$$

(where k is a constant that substantially satisfies k=SAE2/SAE1 when there is no spherical aberration and when the focal point shift amount is within a predetermined range).

5. The optical head according to claim 1, wherein the light splitting device includes a polarizing hologram.

6. The optical head according to claim 1,
wherein the light receiving element is an integrated light receiving/emitting element that is configured as a single unit with the light source.

7. The optical head according to claim 1,
wherein the light receiving element is an integrated optical element in which the light source and the light splitting device are configured as a single unit.

8. The optical head according to claim 1, further comprising:
a liquid crystal element provided between the objective lens and the light splitting device, and
spherical aberration corrector for correcting the spherical aberration by changing the phase of wave fronts that pass through the liquid crystal element due to the application of a voltage in accordance with the spherical aberration correction signal created by the spherical aberration detection part.

9. The optical head according to claim 1, further comprising:
a collimator lens, provided between the objective lens and the light splitting device, that converts the laser light radiated from the light source to substantially parallel light; and
spherical aberration corrector for correcting the spherical aberration by moving the collimator lens in the direction of the optical axis of the laser light, in accordance with the spherical aberration correction signal created by the spherical aberration detection part.

* * * * *

UNITED STATES PATENT AND TRADEMARK OFFICE
CERTIFICATE OF CORRECTION

| | | |
|---|---|---|
| PATENT NO. | : 7,746,736 B2 | Page 1 of 1 |
| APPLICATION NO. | : 11/810077 | |
| DATED | : June 29, 2010 | |
| INVENTOR(S) | : Yamasaki et al. | |

It is certified that error appears in the above-identified patent and that said Letters Patent is hereby corrected as shown below:

On the Page 2 of the Title page of the patent,

Number (56) References Cited - U.S. PATENT DOCUMENTS

"2004/0082097 A1    4/2004 Lohmeyer et al." should read -- 2002/0056802 A1    4/2004 Lohmeyer et al. --.

Signed and Sealed this

Fourth Day of January, 2011

David J. Kappos
*Director of the United States Patent and Trademark Office*